US012348855B2

(12) United States Patent
Desserrey et al.

(10) Patent No.: US 12,348,855 B2
(45) Date of Patent: Jul. 1, 2025

(54) PROVIDING DRAGGABLE SHUTTER BUTTON DURING VIDEO RECORDING

(71) Applicant: Snap Inc., Santa Monica, CA (US)

(72) Inventors: Laurent Desserrey, Los Angeles, CA (US); Ranidu Lankage, Belmont, CA (US); Jane Meng, Los Angeles, CA (US); Evan Spiegel, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/326,789

(22) Filed: May 31, 2023

(65) Prior Publication Data
US 2024/0406539 A1  Dec. 5, 2024

(51) Int. Cl.
*H04N 23/63* (2023.01)
*H04N 5/77* (2006.01)
*H04N 23/667* (2023.01)

(52) U.S. Cl.
CPC ............. *H04N 23/632* (2023.01); *H04N 5/77* (2013.01); *H04N 23/667* (2023.01)

(58) Field of Classification Search
CPC ....... H04N 23/632; H04N 23/667; H04N 5/77
See application file for complete search history.

(56) References Cited

U.S. PATENT DOCUMENTS

| 7,971,156 | B2 | 6/2011 | Albertson et al. |
| 7,996,793 | B2 | 8/2011 | Latta et al. |
| 8,487,938 | B2 | 7/2013 | Latta et al. |
| 8,856,691 | B2 | 10/2014 | Geisner et al. |
| 9,225,897 | B1 | 12/2015 | Sehn et al. |
| 9,230,160 | B1 | 1/2016 | Kanter |
| 9,276,886 | B1 | 3/2016 | Samaranayake |

(Continued)

FOREIGN PATENT DOCUMENTS

| CN | 103049761 | 8/2016 |
| CN | 109451245 A | 3/2019 |

(Continued)

OTHER PUBLICATIONS

"U.S. Appl. No. 18/326,706, Corrected Notice of Allowability mailed Nov. 15, 2024", 2 pgs.

(Continued)

*Primary Examiner* — Mishawn N. Hunter
(74) *Attorney, Agent, or Firm* — Schwegman Lundberg & Woessner, P.A.

(57) ABSTRACT

Aspects of the present disclosure involve a system comprising a computer-readable storage medium storing a program and method for providing an draggable shutter button during video recording. The program and method provide for displaying a user interface within an application running on a device, the user interface presenting real-time image data captured by a camera of the device, the user interface including a shutter button which is configured to be selectable by a user to initiate video recording in response to a first user gesture; and upon detecting the first user gesture selecting the shutter button, initiating video recording with respect to the real-time image data, and providing for the shutter button to be draggable in predefined directions to perform respective functions related to the video recording.

18 Claims, 15 Drawing Sheets

(56) References Cited

U.S. PATENT DOCUMENTS

| | | |
|---|---|---|
| 9,705,831 B2 | 7/2017 | Spiegel |
| 9,742,713 B2 | 8/2017 | Spiegel et al. |
| 10,102,423 B2 | 10/2018 | Shaburov et al. |
| 10,284,508 B1 | 5/2019 | Allen et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,579,869 B1 | 3/2020 | Xiong et al. |
| 10,614,855 B2 | 4/2020 | Huang |
| 10,748,347 B1 | 8/2020 | Li et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 11,307,747 B2 | 4/2022 | Dancie et al. |
| 11,531,402 B1 | 12/2022 | Stolzenberg |
| 11,546,505 B2 | 1/2023 | Canberk |
| 2009/0012788 A1 | 1/2009 | Gilbert et al. |
| 2011/0301934 A1 | 12/2011 | Tardif |
| 2014/0171036 A1 | 6/2014 | Simmons |
| 2015/0120293 A1 | 4/2015 | Wohlert et al. |
| 2015/0370320 A1 | 12/2015 | Connor |
| 2016/0241777 A1 | 8/2016 | Rav-Acha et al. |
| 2017/0123487 A1 | 5/2017 | Hazra et al. |
| 2017/0257559 A1* | 9/2017 | Stricker ............... H04N 23/631 |
| 2017/0277684 A1 | 9/2017 | Dharmarajan Mary |
| 2017/0277685 A1 | 9/2017 | Takumi |
| 2017/0351910 A1 | 12/2017 | Elwazer et al. |
| 2018/0091728 A1* | 3/2018 | Brown ..................... H04N 5/91 |
| 2018/0158370 A1 | 6/2018 | Pryor |
| 2019/0250812 A1 | 8/2019 | Davydov et al. |
| 2021/0006710 A1 | 1/2021 | Li |
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0174034 A1 | 6/2021 | Retek et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |
| 2021/0397338 A1 | 12/2021 | Davydov et al. |
| 2021/0405761 A1 | 12/2021 | Canberk |
| 2022/0188539 A1 | 6/2022 | Chan et al. |
| 2022/0206588 A1 | 6/2022 | Canberk et al. |
| 2022/0207805 A1 | 6/2022 | Anvaripour et al. |
| 2022/0300730 A1 | 9/2022 | Eirinberg et al. |
| 2022/0300731 A1 | 9/2022 | Eirinberg et al. |
| 2022/0311931 A1 | 9/2022 | Yin et al. |
| 2022/0326781 A1 | 10/2022 | Hwang et al. |
| 2022/0334649 A1 | 10/2022 | Hwang et al. |

FOREIGN PATENT DOCUMENTS

| | | |
|---|---|---|
| CN | 111787140 A | 10/2020 |
| EP | 3707693 | 9/2020 |
| EP | 3955564 A1 | 2/2022 |
| KR | 20220158824 | 12/2022 |
| WO | 2016168591 | 10/2016 |
| WO | 2019094618 | 5/2019 |
| WO | 2022005687 | 1/2022 |
| WO | 2022005693 | 1/2022 |
| WO | 2022060549 | 3/2022 |
| WO | 2022066578 | 3/2022 |
| WO | 2022132381 | 6/2022 |
| WO | 2022146678 | 7/2022 |
| WO | 2022198182 | 9/2022 |
| WO | 2022216784 | 10/2022 |
| WO | 2022225761 | 10/2022 |
| WO | 2022245765 | 11/2022 |

OTHER PUBLICATIONS

"U.S. Appl. No. 18/326,706, Non Final Office Action mailed Mar. 5, 2024", 12 pgs.

"U.S. Appl. No. 18/326,706, Notice of Allowance mailed Aug. 6, 2024", 7 pgs.

"U.S. Appl. No. 18/326,706, Response filed Jun. 5, 2024 to Non Final Office Action mailed Mar. 5, 2024", 8 pgs.

"International Application Serial No. PCT/US2024/031738, International Search Report mailed Sep. 4, 2024", 4 pgs.

"International Application Serial No. PCT/US2024/031738, Written Opinion mailed Sep. 4, 2024", 5 pgs.

Brown, Shelby, "Actually, You can Take Pictures and Video on iPhone Simultaneously", [Online]. Retrieved from the Internet: <URL: https://www.cnet.com/tech/mobile/actually-you-can-take-pictures-and-video-on-iphone-simultaneously/>, (Mar. 24, 2022), 5 pgs.

* cited by examiner

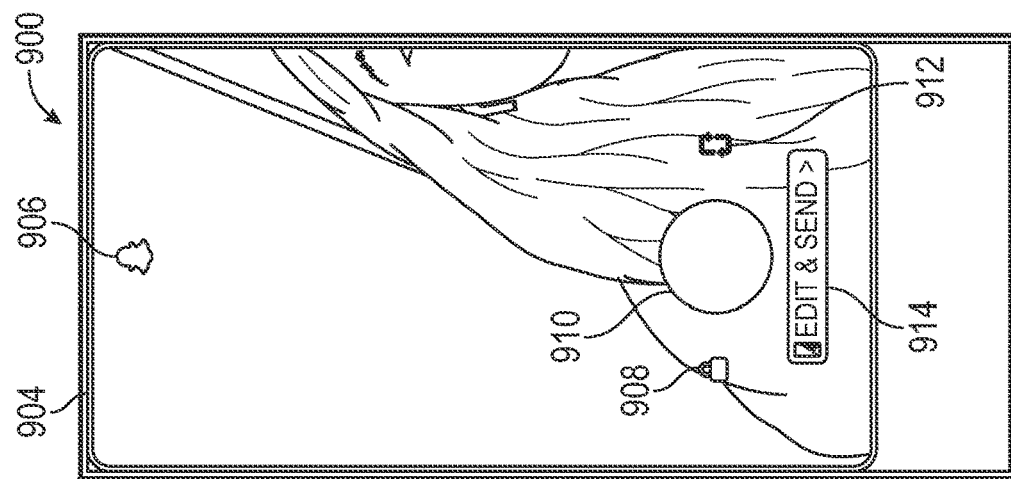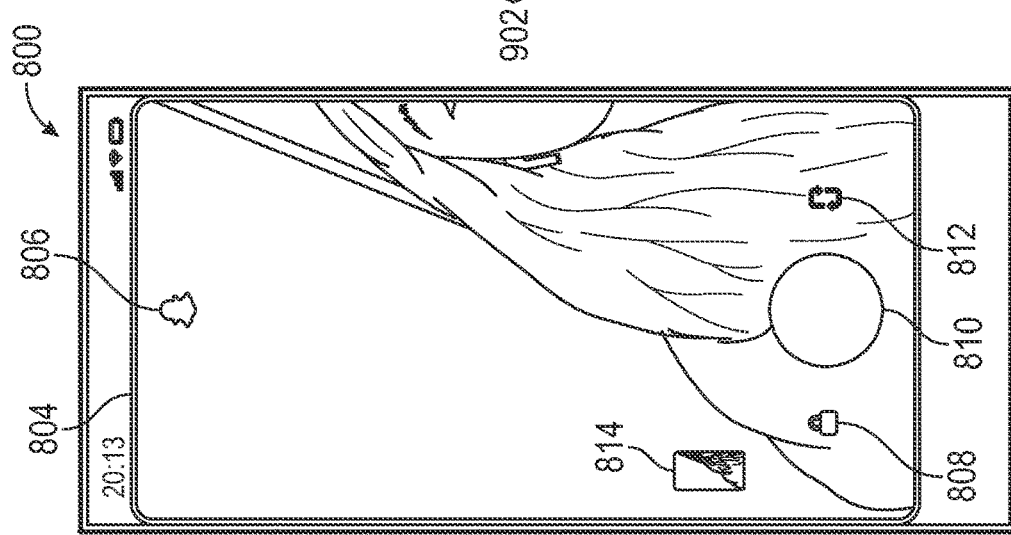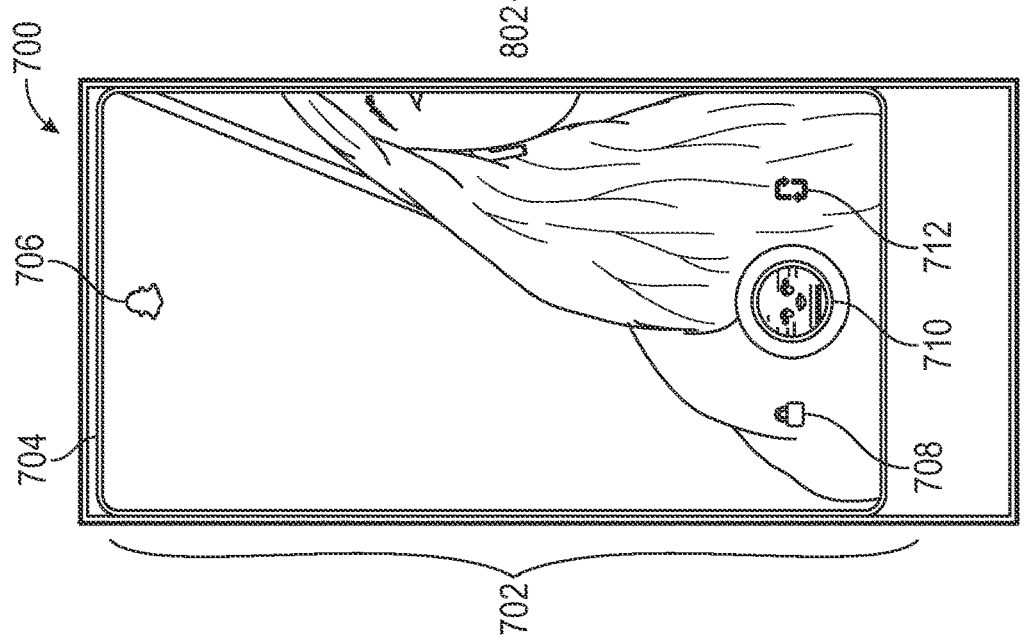

PROVIDING DRAGGABLE SHUTTER BUTTON DURING VIDEO RECORDING

TECHNICAL FIELD

The present disclosure relates generally to a messaging system, including providing a draggable shutter button during video recording.

BACKGROUND

Systems such as messaging systems provide for the exchange of message content between users. For example, such systems allow users to exchange message content (e.g., text, video, pictures) between each other.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 7 illustrates an example user interface for providing an indication of video recording together with augmented reality content, in accordance with some examples.

FIG. 8 illustrates an example user interface for providing an indication of video recording together with a preview icon, in accordance with some examples.

FIG. 9 illustrates an example user interface for providing an indication of video recording in association with a multi-clip capture mode, in accordance with some examples.

DETAILED DESCRIPTION

Systems such as messaging systems typically allow users to exchange media content items (e.g., messages, images and/or video) with one another. As described herein, the system provides for a user to capture video, and provides for facilitated access to functions related to video recording while video is being recorded.

The disclosed embodiments relate to a system which provides a shutter button to be draggable during video recording. The shutter button is draggable in different directions to perform respective functions related to video recording. In response to a press-and-hold gesture of the shutter button, the interaction client 104 initiates video recording. The interaction client 104 also presents a hands-free icon (e.g., a lock icon) for hands-free video recording, and a flip camera icon for switching between front and rear-facing cameras while recording. The interaction client 104 provides for the shutter button to be draggable in: a first direction (e.g., left, towards the hands-free icon) to initiate hands-free recording; a second direction (e.g., right, towards the flip camera icon) to switch between the front-facing camera and the rear-facing camera; a third direction (e.g., upward) to zoom in on image data captured in real-time; and a fourth direction (e.g., downward) to zoom out with respect to the captured image data.

By virtue of providing a shutter button that is draggable in different directions for different functions, the system provides increased interactive feedback and facilitates video recording. Without providing such a draggable shutter button, performing the various functions may be difficult and/or cumbersome during video recording. Thus, the interaction client 104 facilitates the capturing of videos, thereby saving time for the user (e.g., by reducing the number of retakes), and reducing computational resources/processing power for the interaction system 100.

Networked Computing Environment

Figure 1:
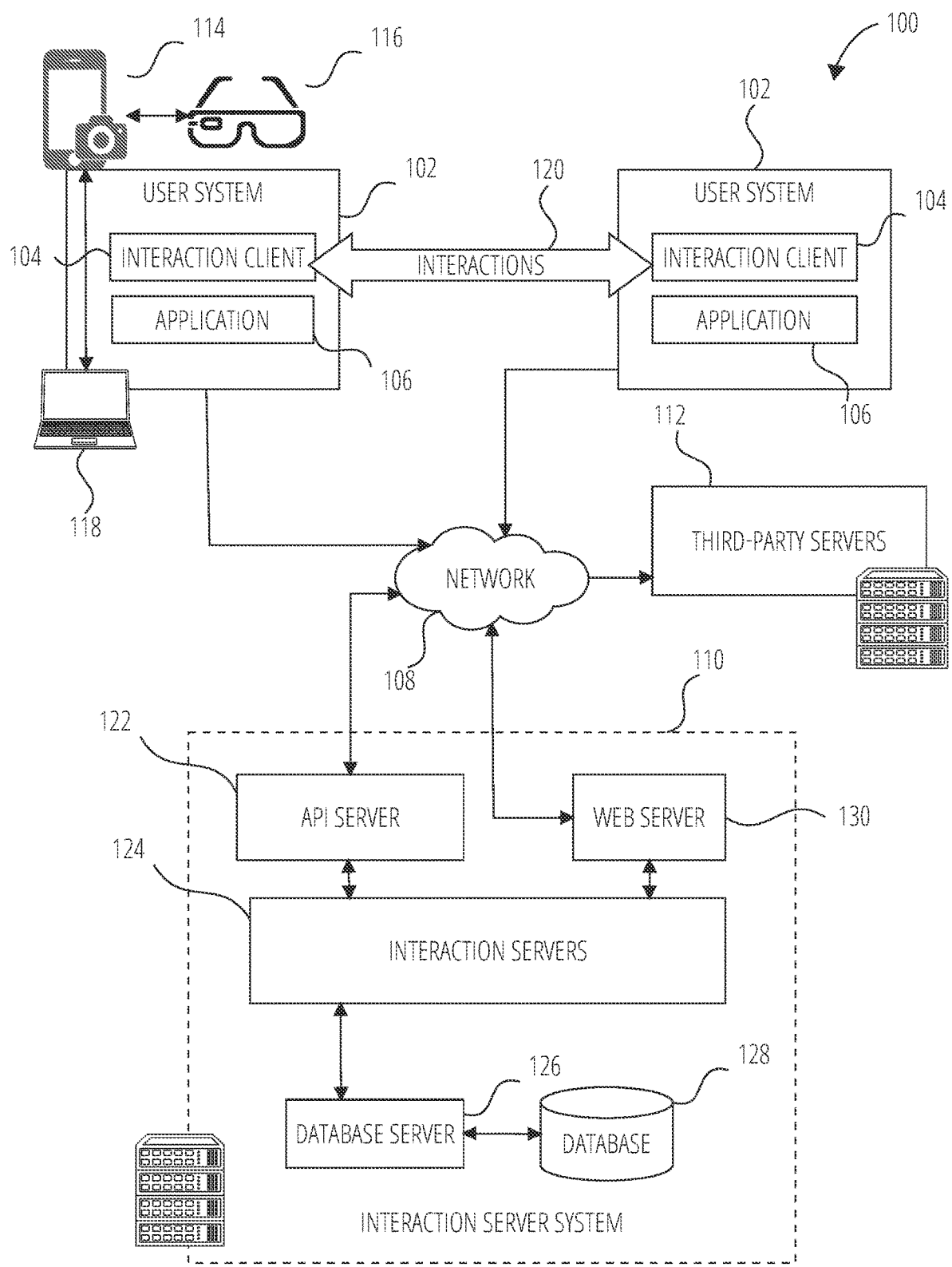
FIG. 1 is a diagrammatic representation of a networked environment in which the present disclosure may be deployed, according to some examples.

FIG. 1 is a block diagram showing an example interaction system 100 for facilitating interactions (e.g., exchanging text messages, conducting text audio and video calls, or playing games) over a network. The interaction system 100 includes multiple client systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the client systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104).

The interaction servers 124 host multiple systems and subsystems, described below with reference to FIG. 2.

System Architecture

Figure 2:
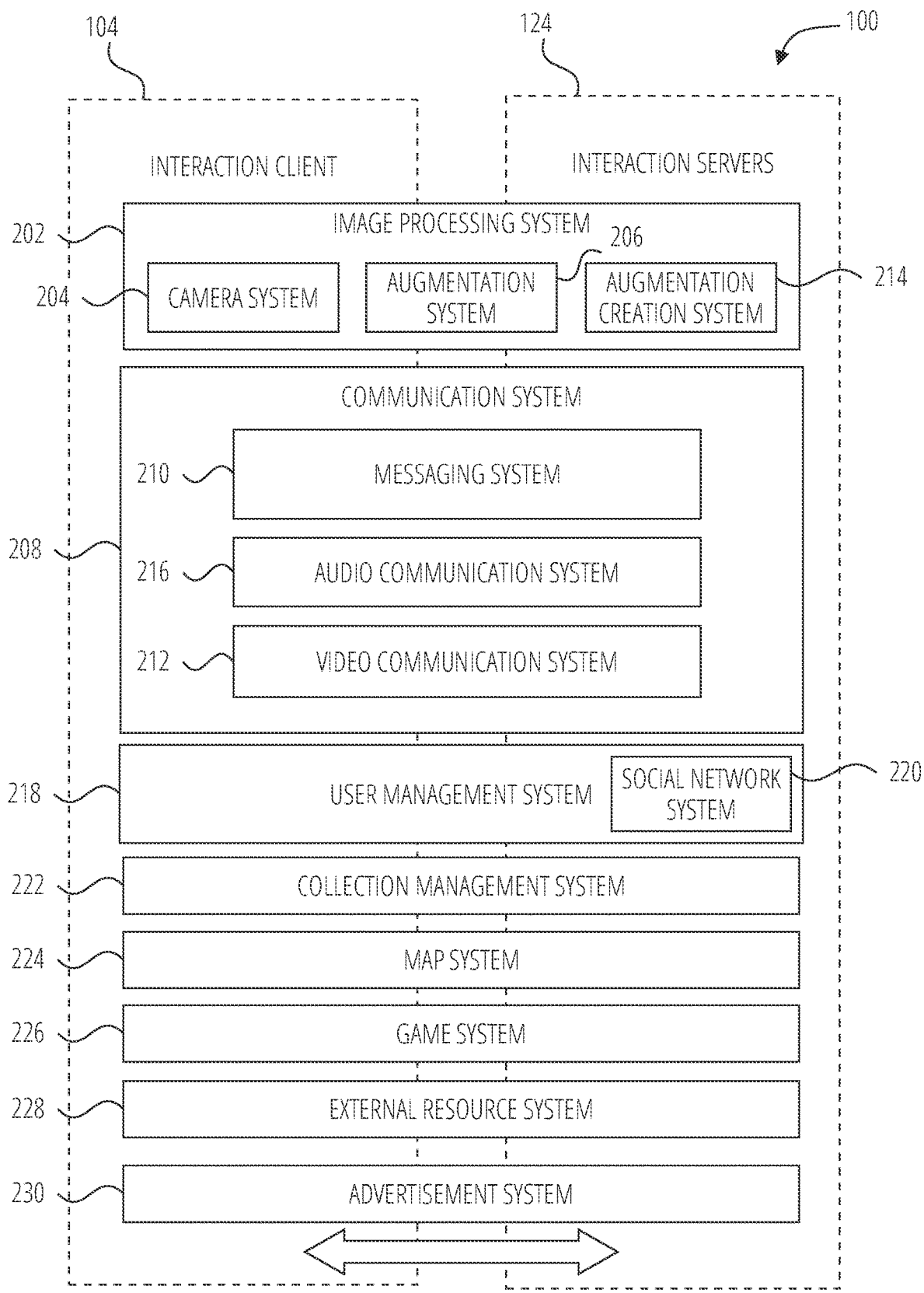
FIG. 2 is a diagrammatic representation of a messaging system, according to some examples, that has both client-side and server-side functionality.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. Example subsystems are discussed below An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory of the user system 102. These augmentations are selected by the augmentation system 206 and presented to a user of an interaction client 104, based on a number of inputs and data, such as for example:

Geolocation of the user system 102; and

Social network information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and includes a social network system 220 that maintains information regarding relationships between users of the interaction system 100.

A collection management system 222 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 222 may also be responsible for publishing an icon that provides notification of a particular collection to the user interface of the interaction client 104. The collection management system 222 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 222 employs machine vision (or image recognition technology) and content rules to curate a content collection automatically. In certain examples, compensation may be paid to a user to include user-generated content into a collection. In such cases, the collection management system 222 operates to automatically make payments to such users to use their content.

A map system 224 provides various geographic location functions and supports the presentation of map-based media content and messages by the interaction client 104. For example, the map system 224 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 226 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 228 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A WebViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 230 operationally enables the purchasing of advertisements by third parties for presentation to end-users via the interaction clients 104 and also handles the delivery and presentation of these advertisements.

Data Architecture

Figure 3:
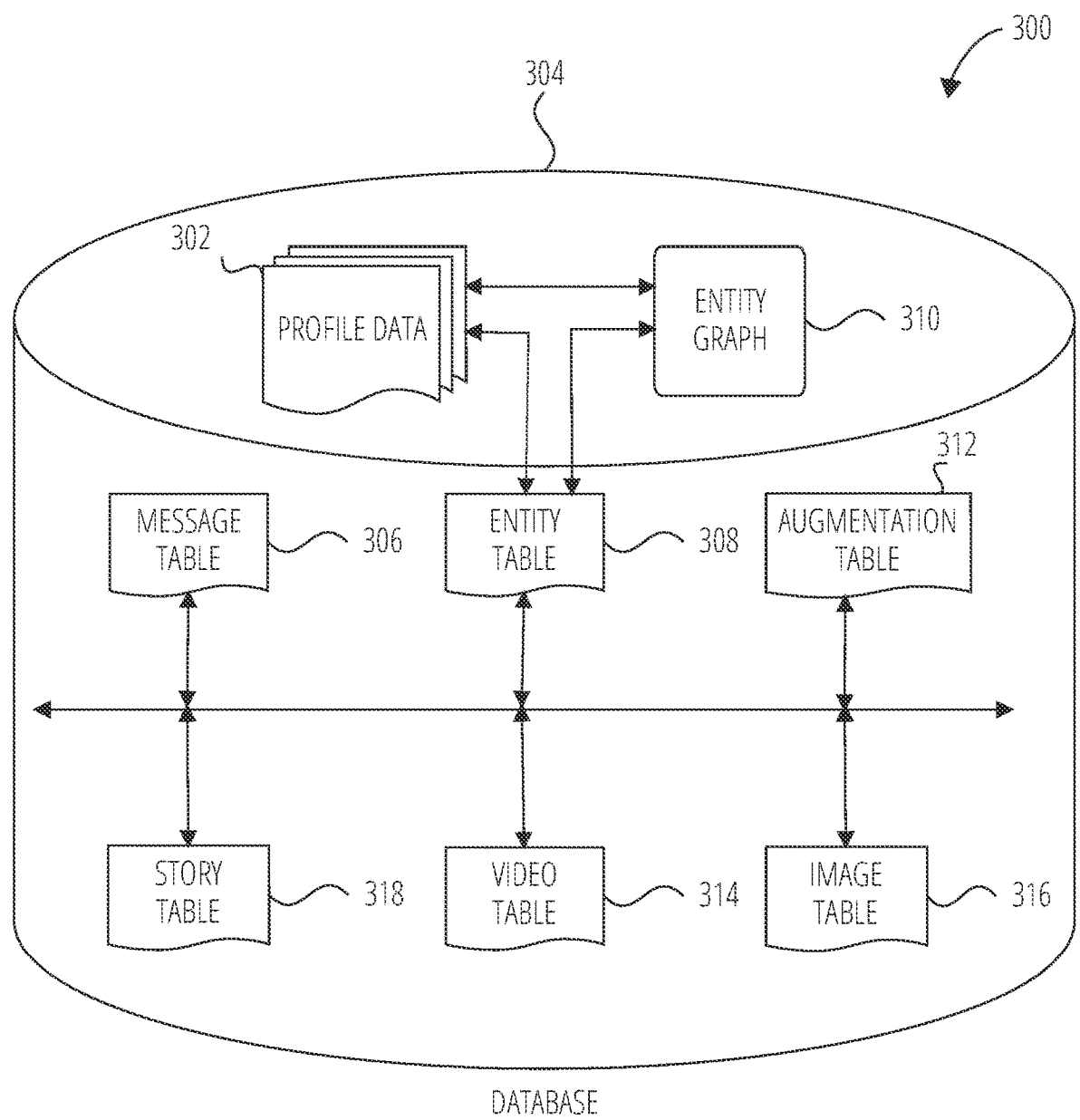
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

Data Communications Architecture

Figure 4:
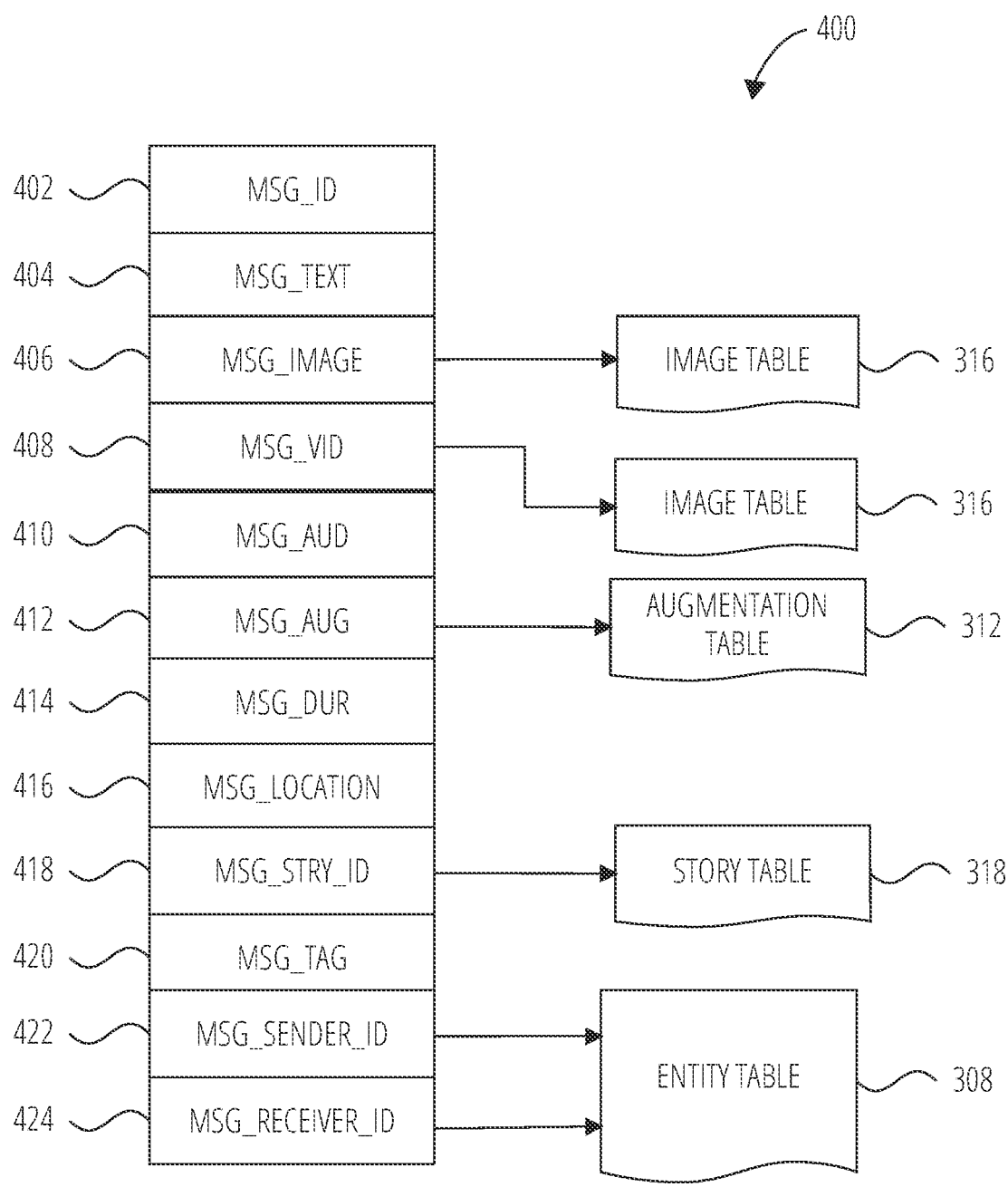
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

- Message identifier 402: a unique identifier that identifies the message 400.
- Message text payload 404: text, to be generated by a user via a user interface of the user system 102, and that is included in the message 400.
- Message image payload 406: image data, captured by a camera component of a user system 102 or retrieved from a memory component of a user system 102, and that is included in the message 400. Image data for a sent or received message 400 may be stored in the image table 316.
- Message video payload 408: video data, captured by a camera component or retrieved from a memory component of the user system 102, and that is included in the message 400. Video data for a sent or received message 400 may be stored in the image table 316.
- Message audio payload 410: audio data, captured by a microphone or retrieved from a memory component of the user system 102, and that is included in the message 400.
- Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the story table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a story table 318, and values stored within the message sender identifier 422 and the message receiver identifier 424 may point to user records stored within an entity table 308.

Figure 5:
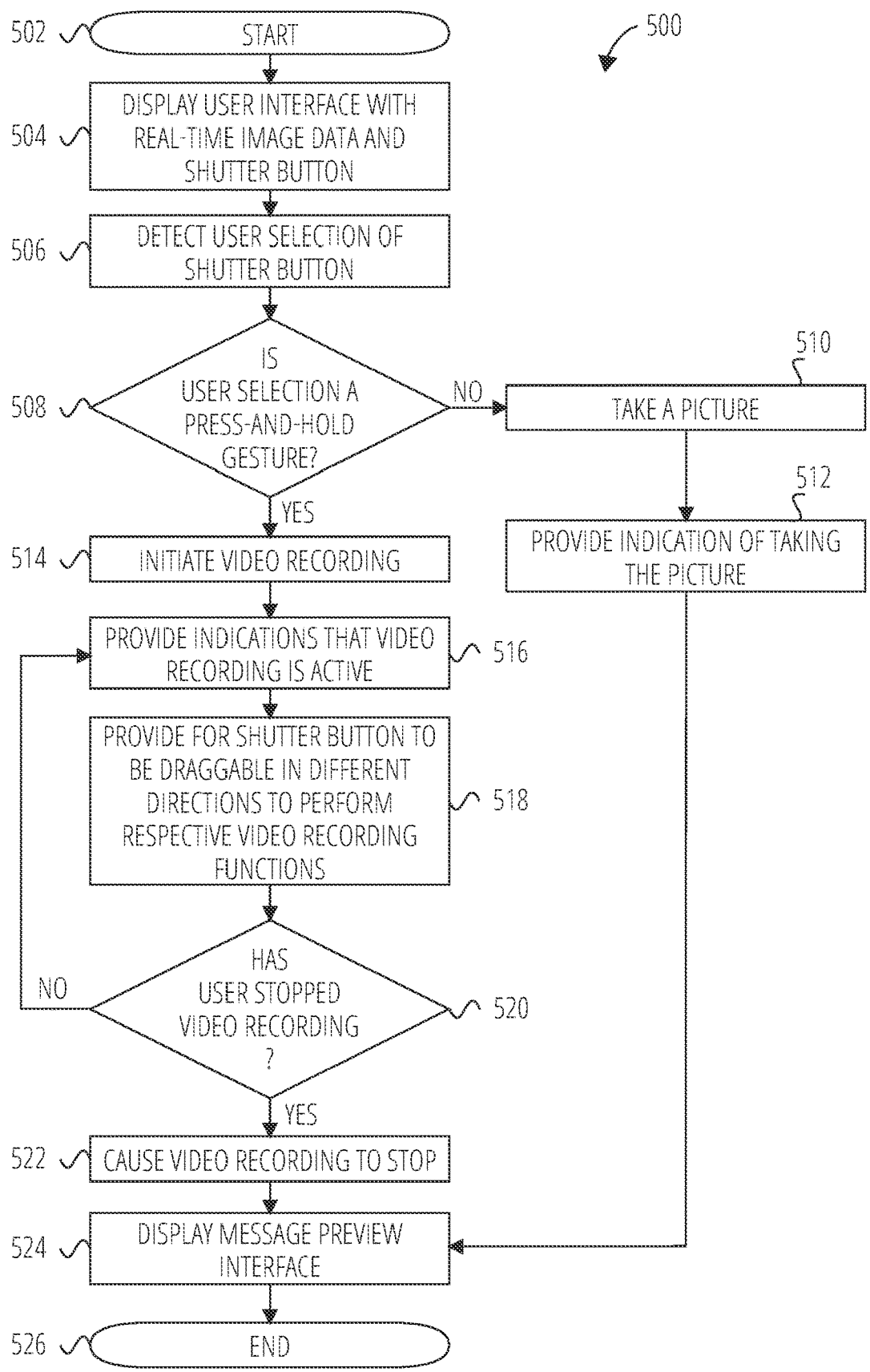
FIG. 5 is flowchart illustrating a process for providing a draggable shutter button during video recording, in accordance with some examples.

FIG. 5 is flowchart illustrating a process 500 for providing a draggable shutter button during video recording, in accordance with some examples. For explanatory purposes, the process 500 is primarily described herein with reference to the interaction client 104 of FIG. 1. However, one or more blocks (or operations) of the process 500 may be performed by one or more other components, and/or by other suitable devices. Further for explanatory purposes, the blocks (or operations) of the process 500 are described herein as occurring in serial, or linearly. However, multiple blocks (or operations) of the process 500 may occur in parallel or concurrently. In addition, the blocks (or operations) of the process 500 need not be performed in the order shown and/or one or more blocks (or operations) of the process 500 need not be performed and/or can be replaced by other operations. The process 500 may be terminated when its operations are completed. In addition, the process 500 may correspond to a method, a procedure, an algorithm, etc.

In example embodiments, the interaction client 104 is running on a user system 102 associated with a user of the interaction system 100. The user is associated with a user account of the interaction system 100 in conjunction with the user management system 218. For example, the user is identified by the user management system 218 based on one or more unique identifiers (e.g., a messaging system identifier, email address and/or a device identifier) associated with the user accounts for the user. In some embodiments, the user management system 218 implements and/or works in conjunction with the social network system 220 which is configured to identify other users (e.g., friends) with which the user of the interaction client 104 has relationships.

As described herein, the interaction client 104 provides for a shutter button to be draggable in different directions to perform respective functions associated with video recording. In response to a press-and-hold gesture of the shutter button, the interaction client 104 initiates video recording. The interaction client 104 also presents a hands-free icon (e.g., a lock icon) for hands-free video recording, and a flip camera icon for switching between front and rear-facing cameras while recording. The interaction client 104 provides for the shutter button to be draggable in: a first direction (e.g., left, towards the hands-free icon) to initiate hands-free recording; a second direction (e.g., right, towards the flip camera icon) to switch between the front-facing camera and the rear-facing camera; a third direction (e.g., upward) to zoom in on image data captured in real-time; and a fourth direction (e.g., downward) to zoom out with respect to the captured image data.

Thus, following start block 502, the interaction client 104 displays a user interface with image data and a shutter button (block 504). In example embodiments, the interaction client 104 activates a camera (e.g., front-facing camera, or rear-facing camera) of the user system 102 upon startup. The interaction client 104 provides for displaying, within the user interface, the real-time image data captured by the camera.

In example embodiments, the interaction client 104 also displays a first set of interface elements in conjunction with the real-time image data. By way of non-limiting example, the first set of interface elements includes one or more of: a profile button for surfacing a user profile, a search button for performing various types of searches with respect to the interaction system 100, a memories button for accessing saved media content items, a carousel interface launch button for surfacing a carousel interface for augmented reality content, a toolbar for activating a flash for the camera or for switching between front and rear facing cameras, or a tab bar for navigating between tabs of the interaction client 104.

In a case where the user selects the carousel interface launch button, the interaction client 104 updates the user interface to include a carousel interface. The carousel interface allows the user to cycle through and/or select different augmented reality content items, represented by respective icons, to apply with respect to the captured image data. Each augmented reality content item provides for adding a real-time special effect and/or sound to the captured image data.

In a case where no augmented reality content item is selected, the shutter button appears in a default state. For example, the shutter button appears as a circle with a border (e.g., white border) and no fill. Otherwise, the shutter button includes the respective icon, representing the currently-selected augmented reality content item, centered within the circle.

The shutter button is user-selectable to take a picture (e.g., in response to a press/tap gesture) or to record a video (e.g., in response to a press-and-hold gesture) of the image data captured by the camera. In case an augmented reality content item is selected, the picture or video is modified to include corresponding augmented reality content (e.g., a real-time special effect and/or sound). After completion of the picture or recording the video, the interaction client 104 directs to a message preview interface for generating a media content item (e.g., corresponding to the picture or video with augmented reality content, if applicable), for example, to send to friends, include in a Story, and the like.

In the example of FIG. 5, the interaction client 104 detects user selection of the shutter button (block 506). At decision block 508, the interaction client 104 determines whether the user selection from block 506 is a press-and-hold gesture (e.g., for video recording) or a tap gesture (e.g., for taking a picture). In example embodiments, the interaction client 104 makes such a determination via appropriate API calls with an operating system of the user system 102. For example, a press-and-hold gesture is detectable by the operating system based on a user touching and holding the shutter button for at least a threshold period of time (e.g., ≥0.5 seconds). On the other hand, a tap gesture is detectable by the operating system based on the user touching shutter button for less than the threshold period of time (e.g., <0.5 seconds).

If the user selection at decision block 508 is a press-and-hold gesture, the interaction client 104 causes the user system 102 to initiate video recording (block 514). As noted above, the video recording is based on the real-time image data that is captured and displayed on the user system 102 (e.g., together with augmented reality content, if applicable).

At block 516, the interaction client 104 provides a multiple indications that video recording is active. For example, the interaction client 104 replaces the first set of interface elements with a second set of interface elements within the user interface. As noted above, the first set of interface elements includes one or more of a profile button, a search button, a memories button, a carousel interface launch button, a toolbar or a tab bar. In example embodiments, the interaction client 104 causes the first set of interface elements to fade out in association with being replaced by the second set of interface elements.

By way of non-limiting example, the second set of interface elements includes one or more of: a border for the camera viewport (e.g., a border for the frame/portion of the device screen displaying the real-time image data); an animated icon within the user interface; a hands-free icon which is user-selectable to initiate hands-free recording; and/or a flip camera icon which is user-selectable icon for switching between a front-facing camera and a rear-facing camera while the video recording is active.

With respect to the border, the interaction client 104 presents the border as a solid color (e.g., yellow) along the periphery of the camera viewport. For example, the border is scaled up (e.g., grows from first size to a second size) within the user interface. In addition, the interaction client 104 displays a ring flash effect (e.g., glowing halo) along the periphery of the camera viewport and displays the border (e.g., solid yellow) on top of the ring flash effect.

In example embodiments, the interaction client 104 presents a "bounce" animation with respect to the camera viewport. For example, the bounce animation scales down the camera viewport from its original size to a smaller size, and then scales up the camera viewport from the smaller size to its original size. The border is displayed upon completion of the bounce animation.

Regarding the animated icon, the interaction client 104 scales up a predefined icon within a predefined area of the user interface (e.g., top center and below the border). The interaction client 104 causes the predefined icon to blink within a predefined area of the user interface. For example, the predefined icon scales up to 30×30 pixels, and blinks every second (e.g., where blinking includes changing opacity from 0% to 100% in 0.4 s, pausing for 3 s, and changing opacity from 100% to 0% in 0.3 s). For example, the predefined icon is a ghost icon, a smiley face icon, a logo such as a company logo, or another type of icon.

With respect to the icon for hands-free recording icon, the interaction client 104 scales up this icon within a predefined area of the user interface (e.g., to the left of the shutter button). Moreover, the interaction client 104 scales up the flip camera icon within a predefined area of the user interface (e.g., to the right of the shutter button).

Moreover, if the user selection at decision block 508 is a press-and-hold gesture, the interaction client 104 updates the shutter button within the user interface. As noted above, in a case where no augmented reality content item is selected, the shutter button initially appears as a circle with a border (e.g., white border) and no fill. In example embodiments, updating the appearance of the shutter button includes scaling up the circle and changing the entire circle into a solid color (e.g., yellow).

As noted above, in a case where an augmented reality content item is selected, the shutter button initially includes the respective icon centered within the circle. Updating the appearance of the shutter button includes scaling up the circle, changing the entire circle into the solid color (e.g., yellow), and maintaining the icon centered within the circle on top of the solid color.

In example embodiments, updating the appearance of the shutter button further includes presenting a progress indicator along a periphery of the shutter button. The progress indicator provides a visual indication that the video recording is active and indicates progress of the video recording. For example, the progress indicator is displayed as an animation in which a carved-out segment positioned at the edge of the circle, travels around the circle in a clockwise manner and increases in size. The interaction client 104 provides for each full rotation of the carved-out segment around the circle to take a preset amount of time (e.g., 10 seconds to travel around the circle), with the carved-out segment resetting after each rotation.

As discussed further below with respect to FIG. 8, upon completion of each full rotation, the interaction client 104 displays a preview icon associated with that video segment having the preset time length (e.g., 10 seconds). In example embodiments, the preview icon is a single video frame within the video segment that is automatically selected by the interaction client 104 and/or the interaction server system 110. Additional video segments of the preset time length (e.g., 10 seconds) are added as preview icons within the user interface, to create a series of video segments. For example, the interaction client 104 provides a visual approximation of the length of the video during recording (e.g., approximated as the number of preview icons×the preset time length).

As discussed further below with respect to FIG. 9, the interaction client 104 in conjunction with the interaction server system 110 provides for a multi-clip capture mode.

The multi-clip capture mode is optional and can be selected for activation by the user. The multi-clip capture mode corresponds with capturing multiple video clips or pictures which are combinable to generate a media content item (e.g., for sending to a friend, broadcasting to others, etc.). The multi-clip capture mode provides for a preview bar in which each of the multiple video clips is represented by a thumbnail, and the thumbnails are presented in a combined clip In example embodiments, the combined clip includes front and back handles for trimming the entirety of the combined clip. Moreover, the combined clip is selectable by the user, to trim (e.g., via front and back handles for the individual clip), reorder and/or delete individual video clips.

In the multi-clip capture mode, each clip is a separate video recording (e.g., associated with a respective press-and-hold gesture) or picture (e.g., associated with a respective tap gesture) taken by the user. Thus, with respect to FIG. 5, the interaction client 104 is configured to display the message preview interface (e.g., at block 524) upon user completion of the combined clips. For example, the interaction client 104 provides a message preview button (e.g., an "edit and send" button) for redirecting to the message preview interface.

At block 518, the interaction client 104 provides for the shutter button to be draggable in different directions to perform respective functions related to video recording. By way of non-limiting example, the different directions include: a first direction (e.g., left) to initiate hands-free recording; a second direction (e.g., right) to switch between a front-facing camera and a rear-facing camera of the device; a third direction (e.g., upward) to zoom in on the real-time image data; and a fourth direction (e.g., downward) to zoom out from the real-time image data.

With respect to the first draggable direction, the interaction client 104 provides for the shutter button to be draggable in this direction during video recording (e.g., while the press-and-hold gesture is still being held), to initiate hands-free recording. As described herein, hands-free recording provides for the interaction client 104 to continue video recording without the user continually holding the shutter button 1114. In example embodiments, the first direction is dragging the shutter button towards the hands-free icon (e.g., in the left direction).

In example aspects, the interaction client 104 is configured to detect when the drag gesture meets a preset condition, to prompt the user for hands-free recording. For example, the preset condition corresponds to the shutter button being positioned at least partially on top of the hands-free icon (e.g., based on threshold distances and/or overlap of predefined pixels between the shutter button and the hands-free icon). In this manner, the shutter button can be continually dragged, for example in multiple directions, with hands-free recording being prompted to the user each time the preset condition is met.

In a case where the preset condition is met (e.g., while the shutter button is held), the interaction client 104 is configured to prompt the user by displaying a visual hint (e.g., "release to record hands free"). The visual hint notifies the user that hands-free recording can be initiated by releasing the shutter button. The visual hint is toggled on/off as movement of the shutter button meets and does not meet the preset condition. Upon detecting release of the shutter button while the preset condition is met, the interaction client 104 initiates hands-free recording such that video recording continues while the user is no longer holding the shutter button.

In example embodiments, the interaction client 104 updates the shutter button upon activation of hands-free recording. For example, the interaction client 104 displays an animation which causes the shutter button to return back to its original position (e.g., from bottom-left to bottom-center). In addition, the interaction client 104 causes the shutter button to change from a circle of solid color (e.g., yellow) to a square of the same solid color. In example aspects, the square shape indicates that the shutter button is user-selectable to stop video recording. In example aspects, the interaction client 104 is configured to depict the respective icon for an augmented reality content item, if activated, as centered within the shutter button.

Regarding the second draggable direction, the interaction client 104 provides for the shutter button to be draggable in this direction during video recording (e.g., while the press-and-hold gesture is still being held), to switch between the front-facing camera and the rear-facing camera of the user system 102. In example embodiments, the second direction is dragging the shutter button towards the flip camera icon (e.g., in the right direction).

In example aspects, the interaction client 104 is configured to detect when the drag gesture meets a preset condition so as to switch between the front-facing camera and the rear-facing camera (or vice versa). For example, the preset condition corresponds to the shutter button being positioned at least partially on top of the flip camera icon (e.g., based on threshold distances and/or overlap of predefined pixels between the shutter button and the flip camera icon). In this manner, the shutter button can be continually dragged, for example in multiple directions, with the cameras switching between front-facing and rear-facing each time the preset condition is met.

Regarding the third and fourth draggable directions, the interaction client 104 provides for the shutter button to be draggable in these directions during video recording (e.g., while the press-and-hold gesture is still being held), to respectively zoom in and zoom out. In example embodiments, the third direction is dragging the shutter button upwards, and the fourth direction is dragging the shutter button downwards.

In example aspects, the shutter button can be continually dragged, for example in multiple directions, with the interaction client 104 performing a zoom in for each drag gesture in the third direction (e.g., upwards) and a zoom out for each drag gesture in the fourth direction (e.g., downwards).

At decision block 520, the interaction client 104 determines whether the user has stopped video recording. In a case where the multi-clip capture mode is disabled and hands-free recording is not activated, the interaction client 104 determines that the user selected to stop video recording by detecting release of the press-and-hold gesture. In a case where the multi-clip capture mode is enabled, the interaction client 104 determines that the user selected to stop video recording by detecting user selection of the message preview button (e.g., the "edit and send" button). In a case where hands-free is activated, the interaction client 104 determines that the user selected to stop video recording by detecting user selection of the shutter button (e.g., which is square-shaped during hands-free recording and functions as a stop recording button).

If the user has not stopped video recording, the interaction client 104 continues to provide the indications that video recording is active per block 516 and to provide for the shutter button to be draggable in different directions to perform respective functions per block 518. As shown in the example of FIG. 5, blocks 516-520 are repeated until the user stops video recording. Upon a determination that that the user stops video recording at decision block 520, the interaction client 104 causes the video to stop recording (block 522). The interaction client 104 then displays a message preview interface (block 524).

As noted, the message preview interface provides for a media content item to be generated based on the video recording. In addition, the message preview interface includes editing tools for modifying/annotating (e.g., drawing on, adding text to, adding stickers to, cropping, and the like) the video recording. Moreover, the message preview interface includes interface elements (e.g., buttons) for one or more of: saving the video recording (e.g., with modifications/annotations) as a media content item; creating or updating a Story based on the video recording (e.g., with modifications/annotations); modifying audio signal(s) associated with the video recording, sending a media content item which includes the video recording (e.g., with modifications/annotations) to a contact/friend; and/or broadcasting the media content item in association with a feed interface (e.g., for viewing by other users who are not necessarily contacts/friends).

For multi-clip video capture, the message preview interface includes elements for one or more of: modifying/annotating (e.g., drawing on, adding text to, adding stickers to, cropping, and the like) the each of the captured video clips; combining the captured video clips (e.g., with modifications/annotations) and saving the combined video clips as a single media content item; creating or updating a Story based on the captured video clips (e.g., with modifications/annotations); modifying audio signal(s) associated with each of the captured video clips; sending a media content item which includes the captured video clips (e.g., with modifications/annotations) to a contact/friend; and/or broadcasting the media content item in association with a feed interface. The process then ends at end block 526.

On the other hand, in response to determining that the user selection is not a press-and-hold gesture (e.g., and is instead a tap gesture) at decision block 508, the interaction client 104 at block 510 causes the user system 102 to take a picture. As noted above, the picture is based on the image data that is captured by the device screen and displayed in real-time on the device screen (e.g., together with augmented reality content, if applicable).

At block 512, the interaction client 104 provides an indication of taking the picture within the user interface. For example, the interaction client 104 replaces the above-noted first set of interface elements (e.g., profile button, search button, memories button, carousel interface launch button, toolbar and/or tab bar) with a subset of the second set of interface elements. For example, the interaction client 104 still presents the above-described bounce animation, which scales down the camera viewport from its original size to a smaller size, scales up the camera viewport from the smaller size to its original size), and displays the border upon completion of the bounce animation. However, the subset of the second set of interface elements no longer includes one or more of the animation icon, the hands-free icon and/or the flip camera icon.

After taking the picture, the interaction client 104 displays the message preview interface (block 524). With respect to taking a picture, the message preview interface includes elements for one or more of: modifying/annotating the picture; saving the picture (e.g., with modifications/annotations) as a media content item; creating or updating a Story based on the picture (e.g., with modifications/annotations); modifying audio signal(s) associated with the picture; sending a media content item which includes the picture (e.g., with modifications/annotations) to a contact/friend; and/or broadcasting the media content item in association with a feed interface. The process 500 then ends at end block 526.

Figure 6B:
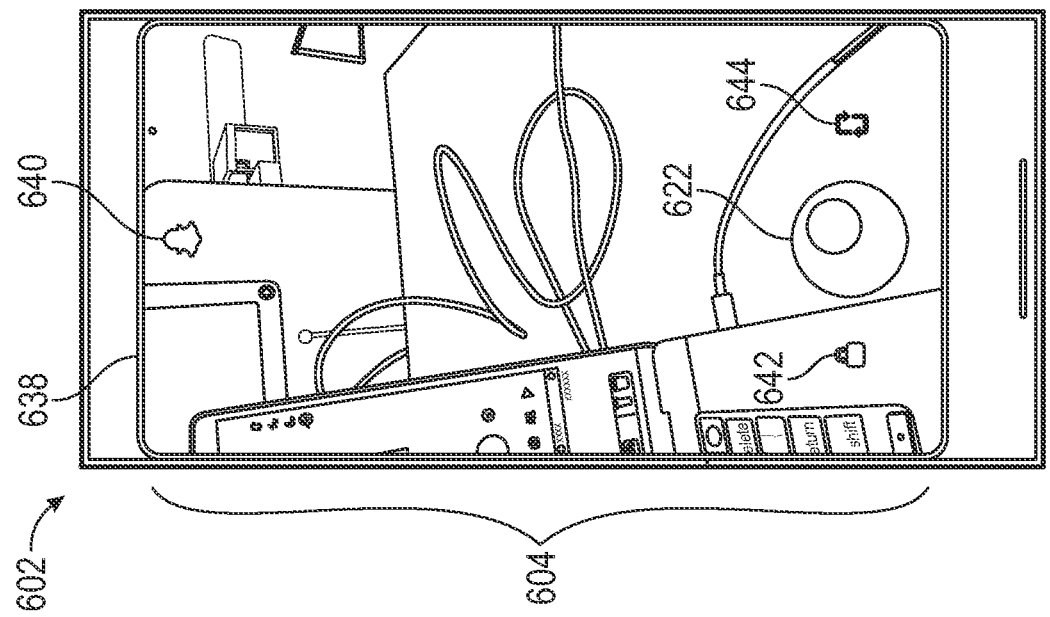
FIGS. 6A-6B illustrate an example user interface for providing an indication of video recording, in accordance with some examples.
Figure 6A:
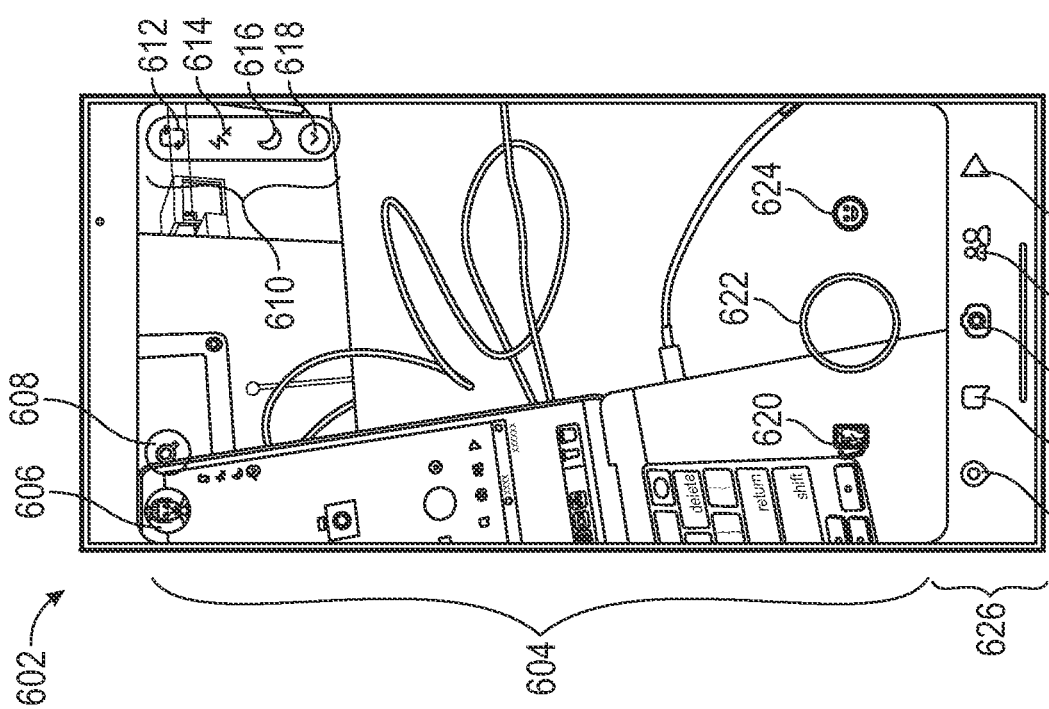

FIGS. 6A-6B illustrate an example user interface 602 for providing an indication of video recording, in accordance with some examples. In the example of FIG. 6A, the user interface 602 includes image data 604, a profile button 606, a search button 608, a toolbar 610 (which includes a flip camera button 612, a flash button 614, a night mode button 616 and an additional tools button 618), a memories button 620, a shutter button 622, a carousel interface launch button 624, and a tab bar 626 (which includes a map tab 628, a chat tab 630, a camera tab 632, a stories tab 634 and a discover tab 636).

For example, the user interface 602 of FIG. 6A corresponds to a camera interface which is presented upon startup of the interaction client 104. The interaction client 104 activates a camera (e.g., a front-facing camera, or a rear-facing camera) upon startup. The user interface 602 displays the captured image data 604 captured by the camera in real-time.

As noted above with respect to FIG. 5, the user interface 602 includes a first set of interface elements in conjunction with the real-time image data. For example, the profile button 606 is user-selectable to surface a user profile, and the search button 608 is user-selectable to perform various types of searches within the interaction client 104.

In example embodiments, the first set of interface elements also includes the memories button 620 which is user-selectable to access saved media content items, and the carousel interface launch button 624 which is user-selectable to surface a carousel interface for augmented reality content. As noted above, the carousel interface (not shown) allows the user to cycle through and/or select different augmented reality content items, represented by respective icons, to apply with respect to the image data 604. Each augmented reality content item provides for adding a real-time special effect and/or sound to the image data 604. In example embodiments, the toolbar 610 includes the flip camera button 612 for switching between front and rear facing cameras, the flash button 614 for activating a flash of the camera, the night mode button 616 for enhancing dark scenes, and the additional tools button 618 for accessing additional modes/features (e.g., including the multi-clip capture mode).

Moreover, the tab bar 626 provides for navigating between tabs of the interaction client 104. By way of non-limiting example, the tab bar 626 includes the map tab 628 which is user-selectable to switch to a map interface which displays user icons or avatars on a map to indicate a current or past location of friends of a user, as well as media content generated by such friends, within the context of a map. The chat tab 630 is user-selectable to switch to a chat interface for communicating between friends of the user. The camera tab 632 is user-selectable to switch to the camera interface (e.g., corresponding to the user interface 602). The stories tab 634 is user-selectable to switch to a stories interface for accessing content collections (e.g., stories) from friends of the user, subscriptions and recommendations. Moreover, the discover tab 636 is user-selectable to switch to a discover interface for accessing original video content (e.g., as provided by an administrator of the interaction system 100), content collections (e.g., stories) that are currently trending on the interaction system 100, and/or content collections (e.g., stories) covering politics, entertainment, sports and more as provided by predetermined publishers (e.g., corporate partners).

As discussed above with respect to FIG. 5, the shutter button 622 is user-selectable to take a picture (e.g., in response to a press/tap gesture) or to record a video (e.g., in response to a press-and-hold gesture) of image data captured by the camera. In the example of FIGS. 6A-6B, the user provides touch input of a press-and-hold gesture. In response to this gesture, the interaction client 104 provides different indications that video recording is active as shown in FIG. 6B.

In the example of FIG. 6B, the user interface 602 provides indications that video recording is active. For example, the user interface 602 replaces the first set of interface elements (e.g., elements 606-620 and 624-636 of FIG. 6A) with a second set of interface elements (e.g., elements 638-644 of FIG. 6B). In example embodiments, the interaction client 104 causes the first set of interface elements to fade out in association with being replaced by the second set of interface elements.

As noted above, the border 638 is presented as a solid color (e.g., yellow) along the periphery of the camera viewport for the image data 604. In example embodiments, the border is scaled up within the user interface 602. While not shown in the example of FIG. 6B, the user interface 602 may include a ring flash effect (e.g., glowing halo) along the periphery of the camera viewport, with the border 638 being displayed on top of the ring flash effect. The user interface 602 presents a bounce animation with respect to the camera viewport, with the border 638 being displayed upon completion of the bounce animation.

In example embodiments, the user interface 602 scales up the animated icon 640 within a predefined area (e.g., top center and within the border 638). The animated icon 640 may scale up to a predefined size (e.g., 30×30 pixels), and blink every predefined interval (e.g., every second). For example, the blinking includes changing opacity from 0% to 100% in 0.4 s, pausing for 3 s, and changing opacity from 100% to 0% in 0.3 s. In the example of FIG. 6B, the animated icon 640 is a ghost icon, but other icons may be used instead (e.g., a smiley face icon, a company logo, or another type of icon).

With respect to the hands-free icon 642, the user interface 602 scales up this icon within a predefined area (e.g., to the left of the shutter button 622). In the example of FIG. 6B, the hands-free icon 642 is depicted as a lock. The user may activate hands-free recording, with respect to the currently-active video recording, via a predefined gesture. For example, the predefined gesture is a slide left gesture while still holding the press-and-hold gesture.

Regarding the flip camera icon 644, the user interface 602 scales up this icon within a predefined area (e.g., to the right of the shutter button 622). The user may switch between the rear and front facing devices cameras, while still recording the current video, via a predefined gesture. For example, the predefined gesture is a slide right gesture while still holding the press-and-hold gesture.

As noted above, the user interface 602 also updates the shutter button 622 to indicate that video recording is active. In a case where no augmented reality content item is selected, the shutter button 622 initially appears as a circle with a border (e.g., white border) and no fill (e.g., shown in FIG. 6A). In the example of FIG. 6B, the user interface 602 updates the appearance of the shutter button 622 by scaling up the circle and changing the entire circle into a solid color (e.g., yellow).

FIG. 7 illustrates an example user interface 700 for providing an indication of video recording together with augmented reality content, in accordance with some examples. Similar to the user interface 602 of FIG. 6B, the user interface 700 of FIG. 7 includes image data 702, a border 704, an animated icon 706, a hands-free icon 708, a shutter button 710 and a flip camera icon 712.

However, the example of FIG. 7 illustrates an example scenario in which the user selected an augmented reality content item via a carousel interface. As noted above, the carousel interface (not shown) is surfaced in response to user selection of the carousel interface launch button (e.g., element 624 in FIG. 6B). The carousel interface present a row of icons, each representing a respective augmented reality content item for applying to the captured image data 702. The icon corresponding to an active augmented reality content item (e.g., which applies a real-time effect/sound to the captured image data) is displayed as centered within the shutter button 710.

In the example of FIG. 7, the user selects to perform a press-and-hold gesture for video recording the captured image data 702. Thus, the shutter button 710 which already includes the respective icon centered within the circle (e.g., having a border in a first color such as white) is scaled up (e.g., the circle grows larger). In addition, the border of the of circle changes color (e.g., to a second color such as yellow). The icon centered within the shutter button 710 is maintained during the press-and-hold gesture.

FIG. 8 illustrates an example user interface 800 for providing an indication of video recording together with a preview icon, in accordance with some examples. Similar to the user interface 602 of FIG. 6B, the user interface 800 of FIG. 8 includes image data 802, a border 804, an animated icon 806, a hands-free icon 808, a shutter button 810 and a flip camera icon 812.

As discussed further below with respect to FIG. 10, updating the appearance of the shutter button 810 includes presenting a progress indicator along a periphery of the shutter button 810. In example embodiments, the interaction client 104 provides for each full rotation of the carved-out segment around the circle to take a preset time (e.g., 10 seconds to travel around the circle).

In the example of FIG. 8, upon completion of each full rotation, the user interface 800 adds a preview icon 814 associated with that video segment having the preset time length (e.g., 10 seconds). As noted above, the preview icon is a single video frame within the video segment that is automatically selected by the interaction client 104. Additional video segments of the preset time length (e.g., 10 seconds) are added as preview icons within the user interface (not shown), to create a series of video segments. For example, the border 804 provides a visual approximation of the length of the video during recording (e.g., approximated as the number of preview icons×the preset time length).

FIG. 9 illustrates an example user interface 900 for providing an indication of video recording in association with a multi-clip capture mode, in accordance with some examples. Similar to the user interface 602 of FIG. 6B, the user interface 900 of FIG. 9 includes image data 902, a border 904, an animated icon 906, a hands-free icon 908, a shutter button 910 and a flip camera icon 912.

As noted above with respect to FIG. 5, the interaction client 104 in conjunction with the interaction server system 110 provides for a multi-clip capture mode. The multi-clip capture mode is optional and can be selected for activation by the user (e.g., as an option accessible via the additional tools button 618 of FIG. 6A). The multi-clip capture mode corresponds with capturing multiple video clips or pictures which are combinable to generate a media content item (e.g., for sending to a friend, broadcasting to others, etc.).

The multi-clip capture mode provides for a preview bar (not shown) in which each of the multiple video clips is represented by a thumbnail, and the thumbnails are presented in a combined clip. In example embodiments, the combined clip includes front and back handles for trimming the entirety of the combined clip. Moreover, the combined clip is selectable by the user, to trim (e.g., via front and back handles for the individual clip), reorder and/or delete individual video clips.

In the multi-clip capture mode, each clip is a separate video recording (e.g., associated with a respective press-and-hold gesture) or picture (e.g., associated with a respective tap gesture) taken by the user. The interaction client 104 is configured to display the message preview interface upon user completion of the combined clips. For example, the user interface 900 includes a message preview button 914 (e.g., an "edit and send" button) for redirecting to the message preview interface.

With respect to the captured video clips, the message preview interface includes elements for one or more of: modifying/annotating the each of the captured video clips, combining the captured video clips and saving the combined video clips as a single media content item; creating or updating a Story based on the captured video clips, modifying audio signal(s) associated with the captured video clips; sending a media content item which includes the captured video clips to a contact/friend, and/or broadcasting the media content item in association with a feed interface.

Figure 10:
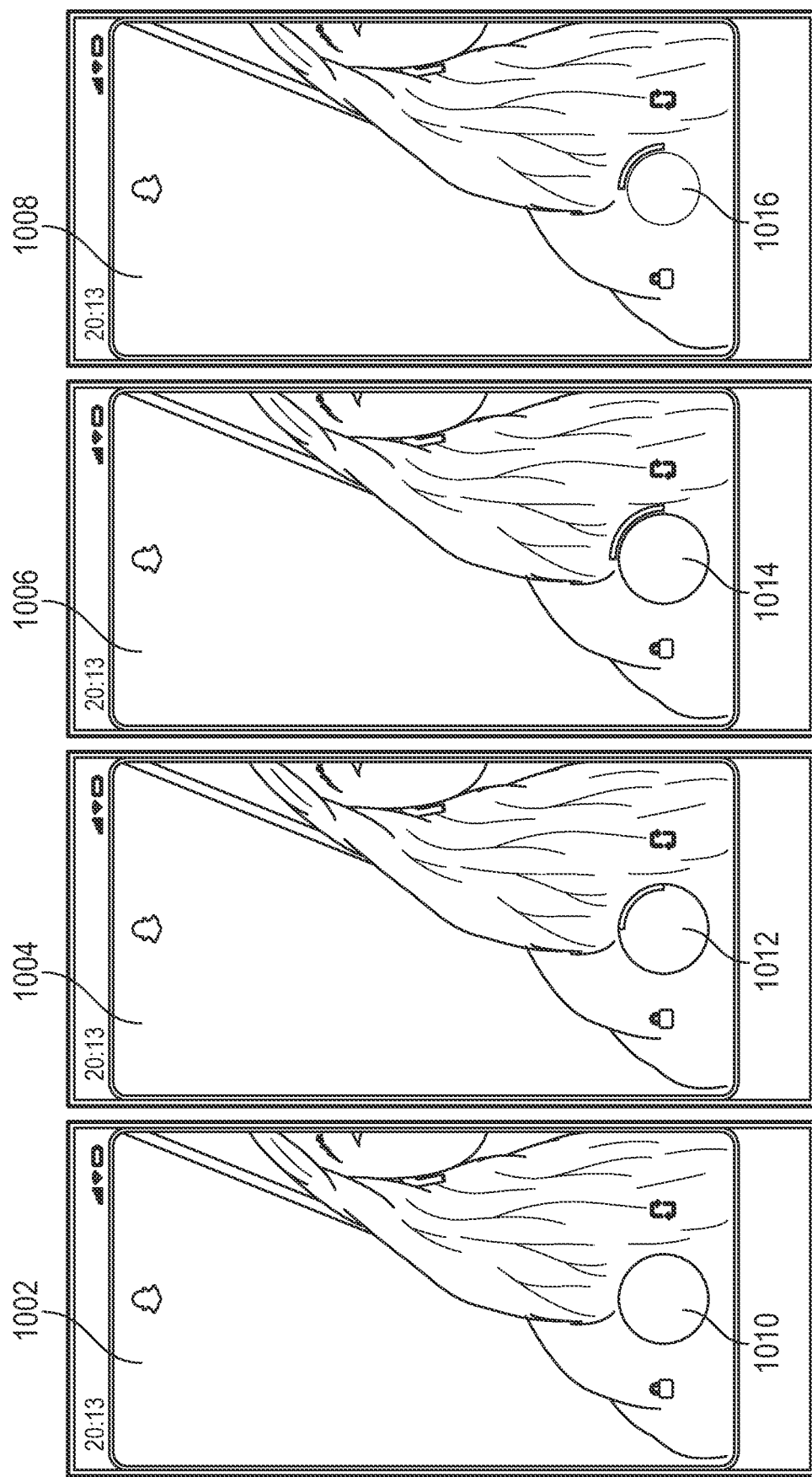
FIG. 10 illustrates example user interfaces for indicating progress of video recording, in accordance with some examples.

FIG. 10 illustrates example user interfaces 1002-1008 for indicating progress of video recording, in accordance with some examples. For example, each of the user interfaces 1002, 1004, 1006 and 1008 corresponds to a different treatment (e.g., version) of showing video recording progress with respect to respective shutter buttons 1010, 1012, 1014 and 1016. In example embodiment, the treatment (e.g., version) is set by an administrator of the interaction system 100.

As noted above, updating the appearance of the shutter button includes presenting a progress indicator along a periphery of the shutter button. For example, the user interface 1004 depicts the shutter button 1012 with a circle in a first color (e.g., yellow) and a progress indicator in a second color (e.g., gray). The progress indicator is displayed as an animation in which a carved-out segment positioned at the edge of the circle, travels around the circle in a clockwise manner and increases in size. Each full rotation of the carved-out segment around the circle takes a preset time (e.g., 10 seconds to travel around the circle), with the carved-out segment resetting after each rotation.

In another example, the user interface 1006 depicts the shutter button 1014 with the circle and progress indicator having the same color (e.g., yellow). Instead of a carved-out segment, the progress indicator is depicted as a growing ring that travels around the circle and resets after each full rotation. In another example, the user interface 1008 depicts the shutter button 1016 with the circle in a first color (e.g., gray) and the progress indicator in second color (e.g., gray). The progress indicator is depicted as a growing ring that travels around the circle and resets after each full rotation. In yet another example, the user interface 1002 depicts the shutter button without a progress indicator.

Figure 11B:
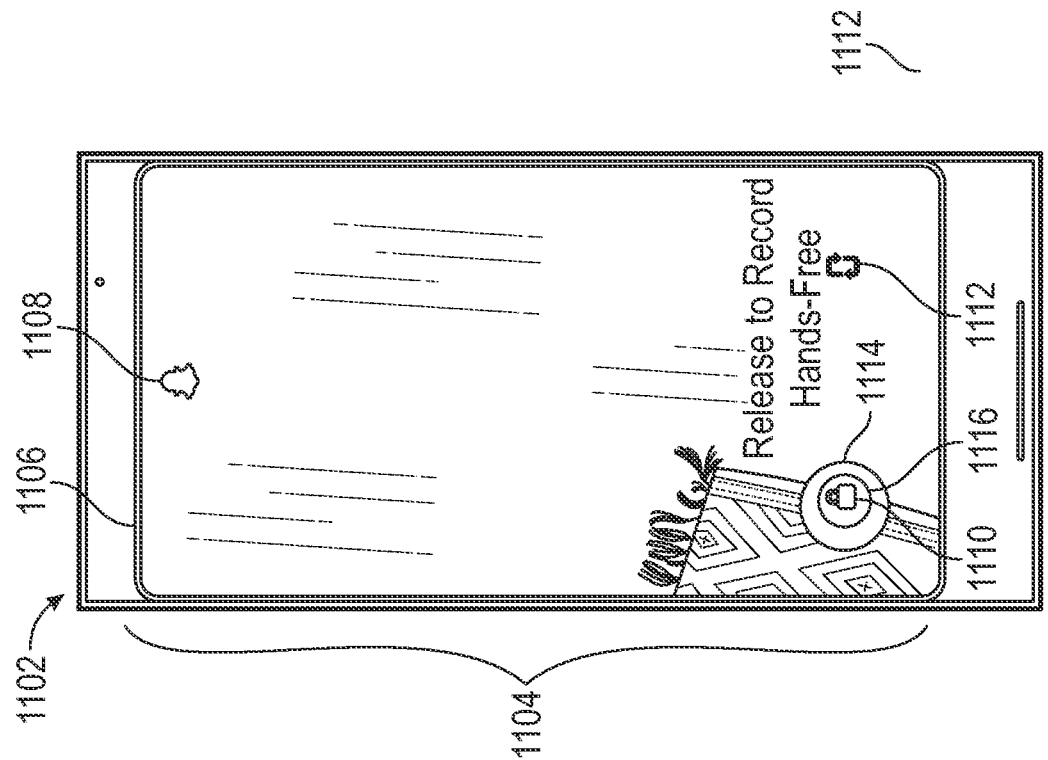
FIGS. 11A-11B illustrate an example user interface for providing a shutter button to be draggable in a first direction to initiate hands-free recording, in accordance with some examples.
Figure 11A:
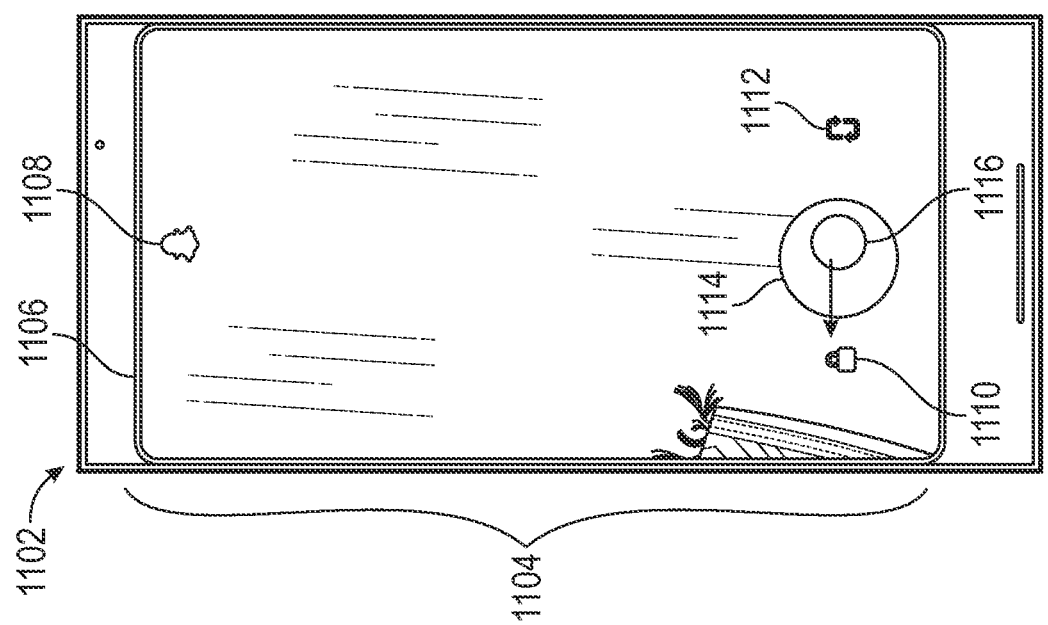

FIGS. 11A-11B illustrate an example user interface 1102 for providing a shutter button to be draggable in a first direction to initiate hands-free recording, in accordance with some examples. Similar to the user interface 602 of FIG. 6B, the user interface 1102 includes image data 1104, a border 1106, an animated icon 1108, a hands-free icon 1110, a flip camera icon 1112 and a shutter button 1114.

FIG. 11A depicts touch input 1116 of the shutter button 1114. For example, the touch input 1116 corresponds to a press-and-hold gesture that initiated video recording, resulting in the display of elements 1106-1112 and in the updated display of the shutter button 1114. For illustrative purposes, the touch input is depicted as a smaller circle within the shutter button 1114.

As noted above, the interaction client 104 provides for the shutter button 1114 to be draggable in a first direction during video recording (e.g., while the press-and-hold gesture is still being held), to initiate hands-free recording. As noted above, hands-free recording provides for the interaction client 104 to continue video recording without the user continually holding the shutter button 1114. In example embodiments, the first direction is dragging the shutter button 1114 towards the hands-free icon 1110 (e.g., in the left direction).

Thus, FIG. 11A illustrates an example scenario in which the user drags the shutter button 1114 in such first direction. For illustrative purposes, the drag gesture is depicted as a left arrow. The interaction client 104 is configured to depict the shutter button 1114 as moving along with the touch input 1116 during the drag gesture. In addition, the interaction client 104 is configured to detect when the drag gesture meets a preset condition so as to prompt the user for hands-free recording.

For example, the preset condition corresponds to the shutter button 1114 being positioned at least partially on top of the hands-free icon 1110 (e.g., based on threshold distances and/or overlap of predefined pixels between the shutter button 1114 and the hands-free icon 1110). In this manner, the shutter button 1114 can be continually dragged, for example in multiple directions, with hands-free recording being prompted to the user when the preset condition is met. In example embodiments, the hands-free icon 1110 changes from a first color (e.g., white) to a second color (e.g., black) when the preset condition is met. Moreover, the shutter button 1114 scales down (e.g., to 80%) while the preset condition is met, and scales back up to its original size when the preset condition is no longer met. In a case where the user releases the press-and-hold gesture while the preset condition is not met, the interaction client 104 stops the video recording and displays the message preview interface (e.g., per blocks 520-524 in FIG. 5).

The example of FIG. 11B illustrates a case where the preset condition is met while the shutter button 1114 is held. In response, the interaction client 104 is configured to prompt the user, by displaying a visual hint (e.g., "release to record hands-free"). The visual hint notifies the user that hands-free recording can be initiated by releasing the shutter button 1114. The visual hint is toggled on/off as movement of the shutter button 1114 meets and does not meet the preset condition. Upon detecting release of the shutter button 1114 while the preset condition is met, the interaction client 104 initiates hands-free recording such that video recording continues while the user is no longer holding the shutter button 1114.

In example embodiments, the interaction client 104 updates the shutter button 1114 upon activation of hands-free recording. For example, the interaction client 104 displays an animation which causes the shutter button 1114 to return back to its original position (e.g., from bottom-left to bottom-center). In addition, the interaction client 104 causes the shutter button 1114 to change from a circle of solid color (e.g., yellow) to a square of the same solid color. In example aspects, the square shape indicates that the shutter button 1114 is user-selectable to stop video recording. Upon detecting a predefined gesture (e.g., a tap gesture) in association with the square-shaped shutter button 1114, the interaction client 104 stops the video recording and displays the message preview interface (e.g., per blocks 520-524 in FIG. 5). While not shown in the example of FIGS. 11A-11B, the interaction client 104 is configured to depict the respective icon for an augmented reality content item, if activated, as centered within the shutter button 1114 (e.g., in both the circular and square shape).

Figure 12B:
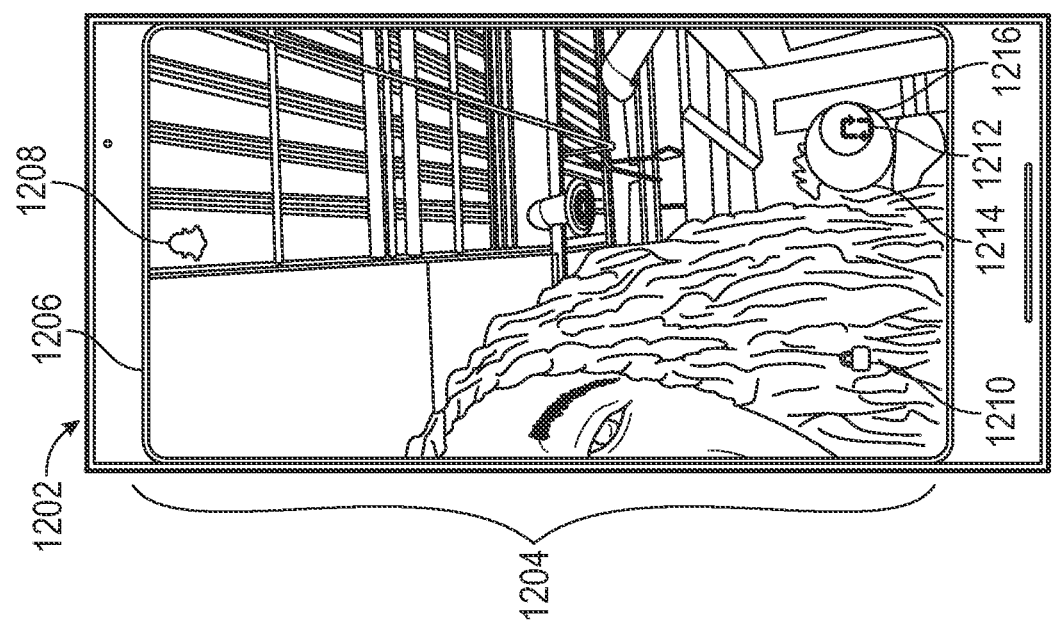
FIGS. 12A-12B illustrate an example user interface for providing a shutter button to be draggable in a second direction to switch between a front-facing camera and a rear-facing camera, in accordance with some examples.
Figure 12A:
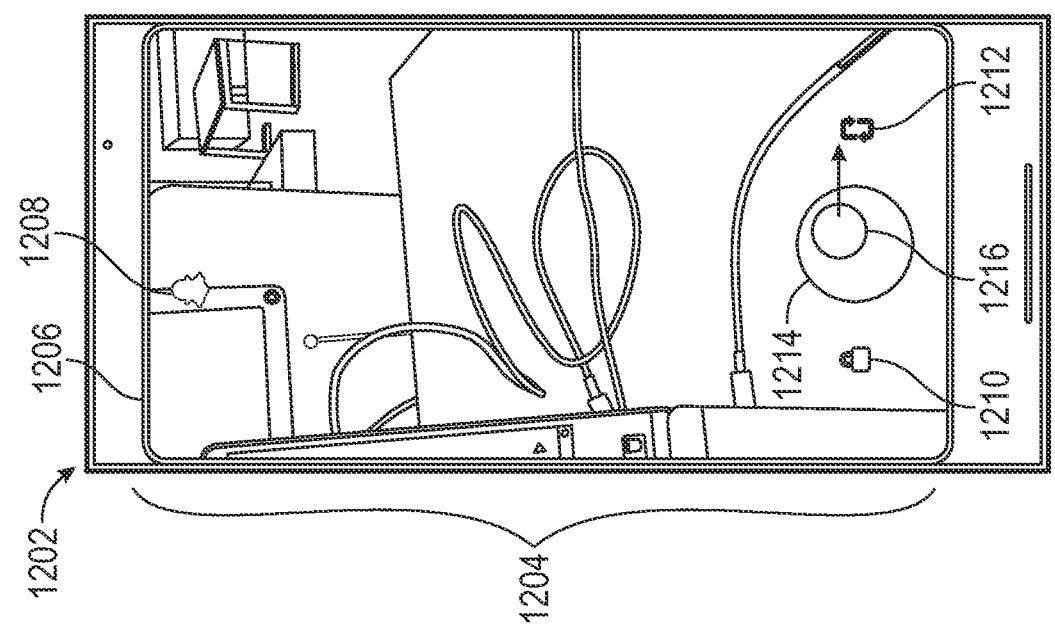

FIGS. 12A-12B illustrate an example user interface 1202 for providing a shutter button to be draggable in a second direction to switch between a front-facing camera and a rear-facing camera, in accordance with some examples. Similar to the user interface 602 of FIG. 6B, the user interface 1202 includes image data 1204, a border 1206, an animated icon 1208, a hands-free icon 1210, a flip camera icon 1212 and a shutter button 1214.

FIG. 12A depicts touch input 1216 of the shutter button 1214. For example, the touch input 1216 corresponds to a press-and-hold gesture that initiated video recording, resulting in the display of elements 1206-1212 and in the updated display of the shutter button 1214. For illustrative purposes, the touch input is depicted as a smaller circle within the shutter button 1214.

As noted above, the interaction client 104 provides for the shutter button 1214 to be draggable in a second direction during video recording (e.g., while the press-and-hold gesture is still being held), to switch between the front-facing camera and the rear-facing camera of the user system 102. In example embodiments, the second direction is dragging the shutter button 1214 towards the flip camera icon 1212 (e.g., in the right direction).

Thus, FIG. 12A illustrates an example scenario in which the user drags the shutter button 1214 in such second direction. For illustrative purposes, the drag gesture is depicted as a right arrow. The interaction client 104 is configured to depict the shutter button 1214 as moving along with the touch input 1216 during the drag gesture. In addition, the interaction client 104 is configured to detect when the drag gesture meets a preset condition so as to switch between the front-facing camera and the rear-facing camera (or vice versa).

With respect to FIG. 12B, the preset condition corresponds to the shutter button 1214 being positioned at least partially on top of the flip camera icon 1212 (e.g., based on threshold distances and/or overlap of predefined pixels between the shutter button 1214 and the flip camera icon 1212). In example embodiments, the flip camera icon 1212 changes from a first color (e.g., white) to a second color (e.g., black) when the preset condition is met In this manner, the shutter button 1214 can be continually dragged, for example in multiple directions, with the cameras switching between front-facing and rear-facing each time the preset condition is met. In a case where the user selects to stop recording (e.g., by release of the press-and-hold gesture, or in association with hands-free recording or multi-clip capture), the interaction client 104 stops the video recording and displays the message preview interface (e.g., per blocks 520-524 in FIG. 5).

Figure 13A:
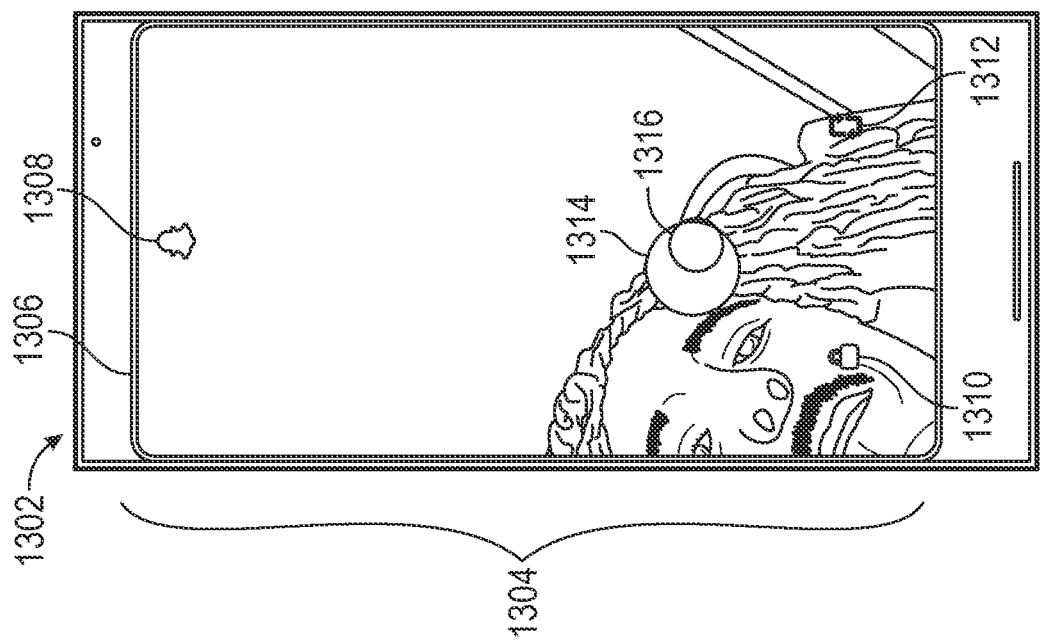
FIGS. 13A-13B illustrate an example user interface for providing a shutter button to be draggable in third and fourth directions to respectively zoom in and out, in accordance with some examples.
Figure 13B:
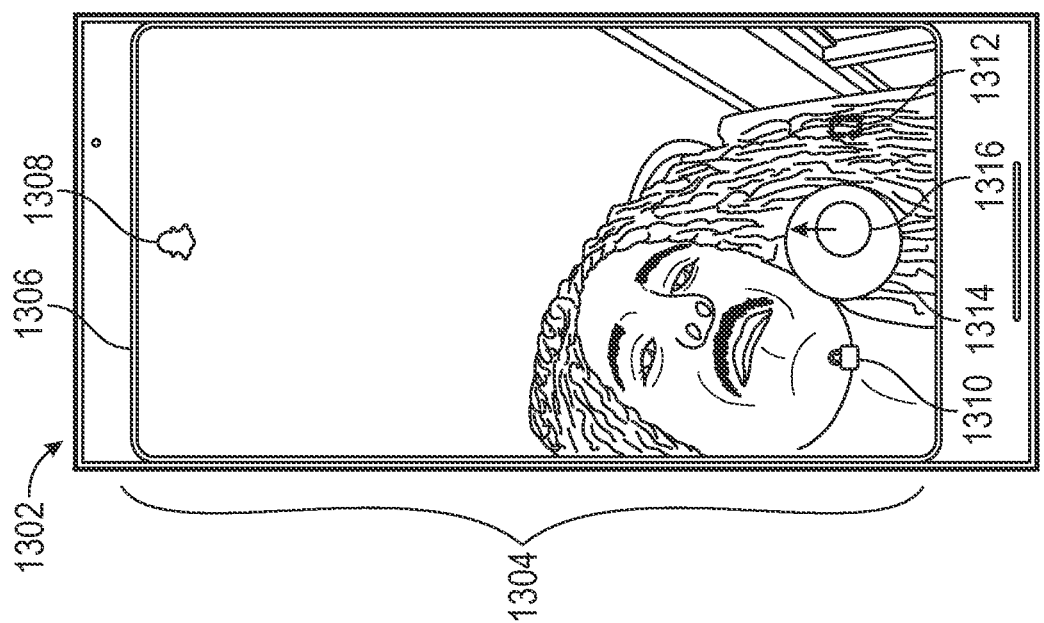

FIGS. 13A-13B illustrate an example user interface 1302 for providing a shutter button to be draggable in third and fourth directions to respectively zoom in and out, in accordance with some examples. Similar to the user interface 602 of FIG. 6B, the user interface 1302 includes image data 1304, a border 1306, an animated icon 1308, a hands-free icon 1310, a flip camera icon 1312 and a shutter button 1314.

FIG. 13A depicts touch input 1316 of the shutter button 1314. For example, the touch input 1316 corresponds to a press-and-hold gesture that initiated video recording, resulting in the display of elements 1306-1312 and in the updated display of the shutter button 1314. For illustrative purposes, the touch input is depicted as a smaller circle within the shutter button 1314.

As noted above, the interaction client 104 provides for the shutter button 1314 to be draggable in third and fourth directions during video recording (e.g., while the press-and-hold gesture is still being held), to respectively zoom in and zoom out. In example embodiments, the third direction is dragging the shutter button 1314 upwards, and the fourth direction is dragging the shutter button 1314 downwards. During a zoom in or zoom out operation, the shutter button 1314 is scaled down (e.g., to 80%) and returns to its original size upon being dragged to the original Y position. In example embodiments, the shutter button 1314 is not draggable down below the original Y position.

FIG. 13A illustrates an example scenario in which the user drags the shutter button 1314 in the third direction (e.g., upward). For illustrative purposes, the drag gesture is depicted as an up arrow. The interaction client 104 is configured to depict the shutter button 1314 as moving along with the touch input 1316 during the drag gesture.

In the example of FIG. 13B, the interaction client 104 provides for a zoom in operation with respect to the image data 1304. While not shown in the example of FIG. 13B, the user may subsequently select to drag the shutter button 1314 in the downward direction, thereby causing the interaction client 104 to perform a zoom out operation with respect to the image data 1304. In this manner, the shutter button 1314 can be continually dragged, for example in multiple directions, with the interaction client 104 performing a zoom in for each drag gesture in the third direction and a zoom out for each drag gesture in the fourth direction. In a case where the user selects to stop recording (e.g., by release of the press-and-hold gesture, or in association with hands-free recording or multi-clip capture), the interaction client 104 stops the video recording and displays the message preview interface (e.g., per blocks 520-524 in FIG. 5).

Figure 14:
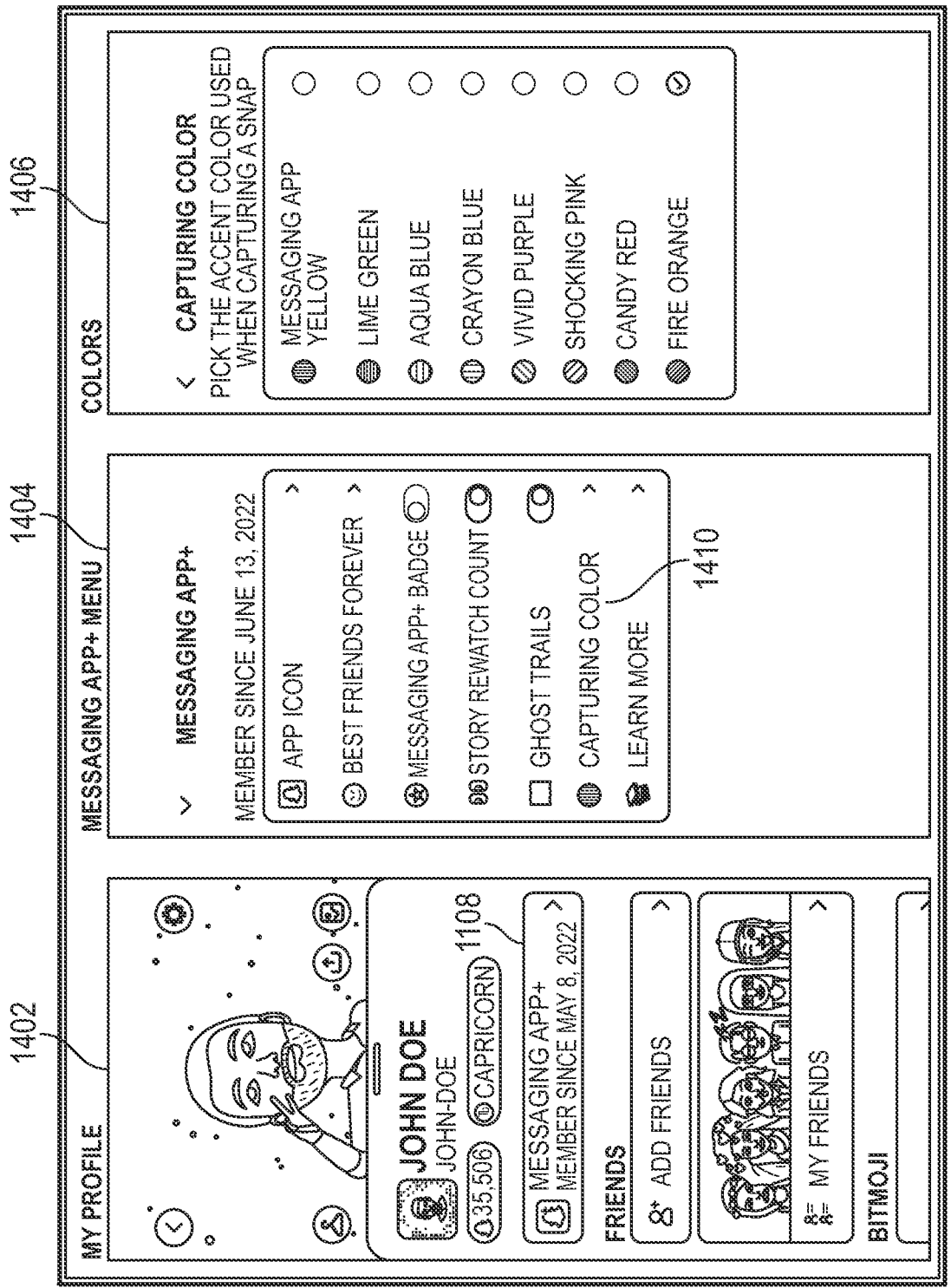
FIG. 14 illustrates example user interfaces for customizing an accent color used to indicate that video recording is active, in accordance with some examples.

FIG. 14 illustrates example user interfaces 1402-1406 for customizing an accent color used to indicate that video recording is active, in accordance with some examples. For example, FIG. 14 depicts a personal profile interface 1402, an exclusive features interface 1404 and a capturing color interface 1406.

In example embodiments, the interaction system 100 provides selected users with exclusive features that are not available to all users of the interaction system 100. For example, the selected users are those users who opt into a subscription plan. The subscription plan corresponds to a paid plan (e.g., a monthly subscription) that provides access to the new and exclusive features. For example, the exclusive features allow for customizing different user interfaces, or interface elements, displayed by the interaction client 104.

In example embodiments, the exclusive features include customization of the accent color used to indicate that video recording is active. For example, the above-described border, animated icon and shutter button are assigned a default color (e.g., yellow) with respect to video recording. The selected users are provided with user interfaces 1402-1406 for changing the default color, while other users of the interaction system 100 (e.g., those who did not opt into the subscription plan) are not provided with such user interfaces.

In the example of FIG. 14, the interaction client 104 provides for a personal profile interface 1402. For example, the personal profile interface 1402 is accessible via user selection of the profile button 606 discussed above with respect to FIG. 6A. The personal profile interface 1402 presents information about the end user, such as user name, telephone number, address, and/or friends (e.g., contacts) of the end user. Moreover, the personal profile interface 1402 includes user-selectable options for updating account settings corresponding to the personal profile, such as personal avatar(s).

For selected users (e.g., those opting into the subscription plan), the personal profile interface 1402 provides additional options for updating account settings. As shown, the personal profile interface 1402 includes an exclusive features button 1408 for redirecting to the exclusive features interface 1404.

The exclusive features interface 1404 includes several options/customizations available to the end user (e.g., who opted into the subscription plan). One such customization is accessible via the capturing color button 1410. User selection of the capturing color button 1410 redirects to the capturing color interface 1406.

As shown in the example of FIG. 14, the capturing color interface 1406 allows the end user to select the accent color to be used when capturing video. As described herein, the accent color applies to the border, animated icon and shutter button used during video recording. In this manner, the interaction system 100 provides for the selected users to customize the accent color used during recording.

Figure 15:
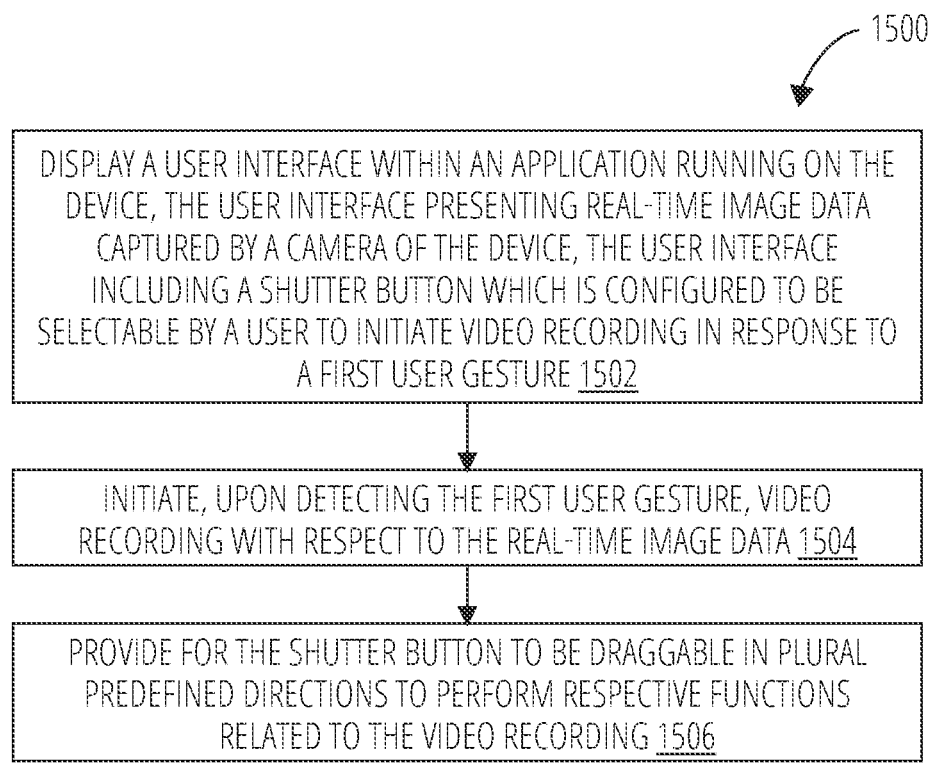
FIG. 15 is a flowchart illustrating a process for providing a draggable shutter button during video recording, in accordance with some examples.

FIG. 15 is a flowchart illustrating a process 1500 for providing a draggable shutter button during video recording, in accordance with some examples. For explanatory purposes, the process 1500 is primarily described herein with reference to the interaction client 104 of FIG. 1. However, one or more blocks (or operations) of the process 1500 may be performed by one or more other components, and/or by other suitable devices. Further for explanatory purposes, the blocks (or operations) of the process 1500 are described herein as occurring in serial, or linearly. However, multiple blocks (or operations) of the process 1500 may occur in parallel or concurrently. In addition, the blocks (or operations) of the process 1500 need not be performed in the order shown and/or one or more blocks (or operations) of the process 1500 need not be performed and/or can be replaced by other operations. The process 1500 may be terminated when its operations are completed. In addition, the process 1500 may correspond to a method, a procedure, an algorithm, etc.

The interaction client 104 displays a user interface within an application running on a device, the user interface presenting real-time image data captured by a camera of the device, the user interface including a shutter button which is configured to be selectable by a user to initiate video recording in response to a first user gesture (block 1502).

The interaction client 104 initiates, upon detecting the first user gesture selecting the shutter button, video recording with respect to the real-time image data (block 1504).

The interaction client 104 provides for the shutter button to be draggable in predefined directions to perform respective functions related to the video recording (block 1506). the shutter button is configured to be fixed in place prior to initiating the video recording.

The predefined directions include one or more of: a first direction (e.g., left) to initiate hands-free recording; a second direction (e.g., right) to switch between a front-facing camera and a rear-facing camera of the device; a third direction (e.g., upward) to zoom in on the real-time image data; and a fourth direction (e.g., downward) to zoom out from the real-time image data.

In example embodiments, the interaction client 104 provides, upon detecting the first user gesture selecting the shutter button, plural indications within the user interface that video recording is active.

In example embodiments, the first user gesture is a press-and-hold gesture, and the plural indications are provided for a duration of the press-and-hold gesture. Upon detecting a release of the press-and-hold gesture, the interaction client 104 causes the video recording to stop, and switches from the user interface to a second user interface for previewing and modifying the video recording.

In example embodiments, the shutter button is selectable to take a picture in response to a second user gesture. Upon detecting the second user gesture selecting the shutter button, the interaction client 104 takes the picture with respect to the real-time image data, and provides an indication of taking the picture within the user interface.

Machine Architecture

Figure 16:
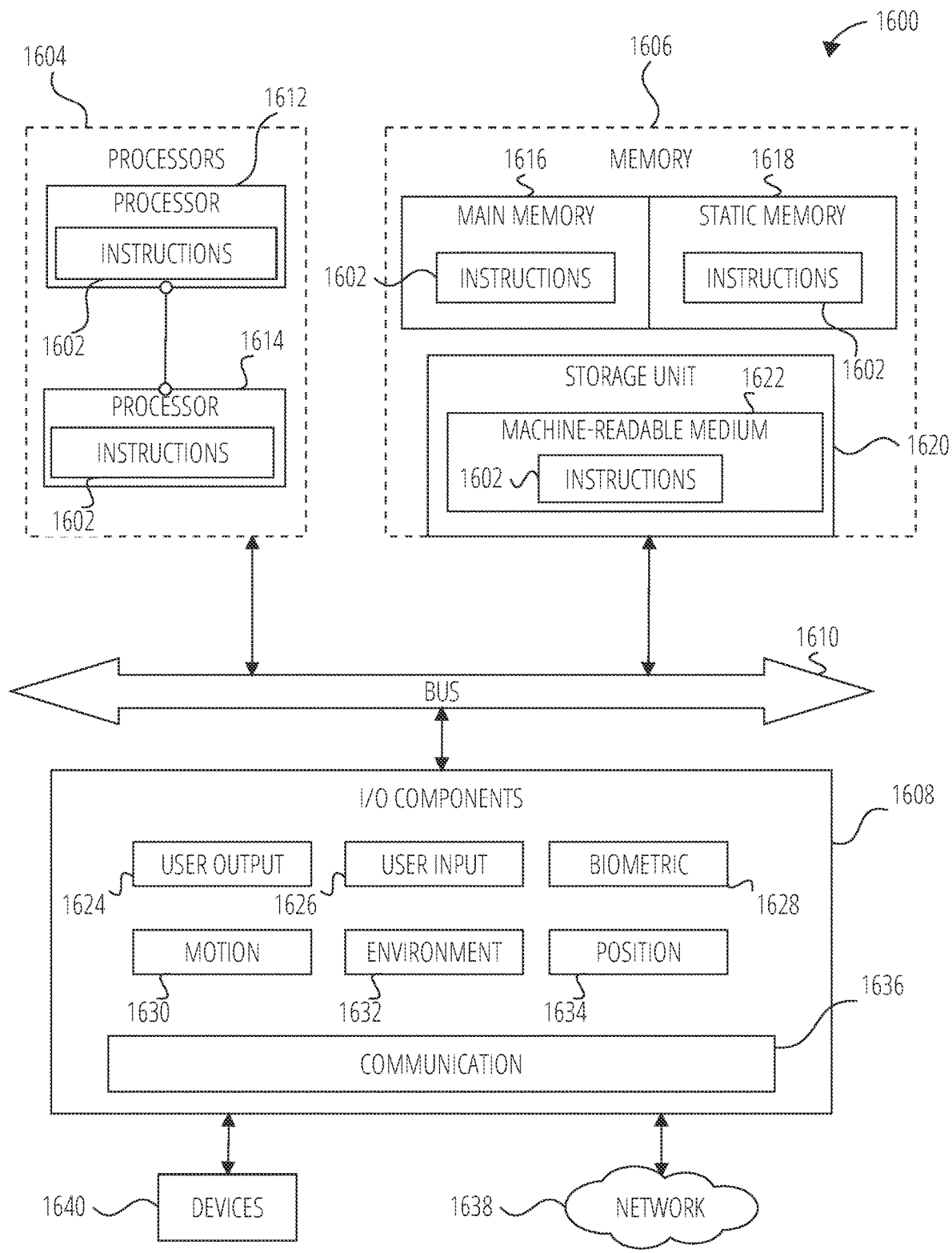
FIG. 16 is a diagrammatic representation of a machine in the form of a computer system within which a set of instructions may be executed to cause the machine to perform any one or more of the methodologies discussed herein, according to some examples.

FIG. 16 is a diagrammatic representation of the machine 1600 within which instructions 1602 (e.g., software, a program, an application, an applet, an app, or other executable code) for causing the machine 1600 to perform any one or more of the methodologies discussed herein may be executed. For example, the instructions 1602 may cause the machine 1600 to execute any one or more of the methods described herein. The instructions 1602 transform the general, non-programmed machine 1600 into a particular machine 1600 programmed to carry out the described and illustrated functions in the manner described. The machine 1600 may operate as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1602, sequentially or otherwise, that specify actions to be taken by the machine 1600. Further, while a single machine 1600 is illustrated, the term "machine" shall also be taken to include a collection of machines that individually or jointly execute the instructions 1602 to perform any one or more of the methodologies discussed herein. The machine 1600, for example, may comprise the user system 102 or any one of multiple server devices forming part of the interaction server system 110. In some examples, the machine 1600 may also comprise both client and server systems, with certain operations of a particular method or algorithm being performed on the server-side and with certain operations of the particular method or algorithm being performed on the client-side.

The machine 1600 may include processors 1604, memory 1606, and input/output I/O components 1608, which may be configured to communicate with each other via a bus 1610.

In an example, the processors 1604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1612 and a processor 1614 that execute the instructions 1602. The term "processor" is intended to include multi-core processors that may comprise two or more independent processors (sometimes referred to as "cores") that may execute instructions contemporaneously. Although FIG. 16 shows multiple processors 1604, the machine 1600 may include a single processor with a single-core, a single processor with multiple cores (e.g., a multi-core processor), multiple processors with a single core, multiple processors with multiples cores, or any combination thereof.

The memory 1606 includes a main memory 1616, a static memory 1618, and a storage unit 1620, both accessible to the processors 1604 via the bus 1610. The main memory 1606, the static memory 1618, and storage unit 1620 store the instructions 1602 embodying any one or more of the methodologies or functions described herein. The instructions 1602 may also reside, completely or partially, within the main memory 1616, within the static memory 1618, within machine-readable medium 1622 within the storage unit 1620, within at least one of the processors 1604 (e.g., within the processor's cache memory), or any suitable combination thereof, during execution thereof by the machine 1600.

The I/O components 1608 may include a wide variety of components to receive input, provide output, produce output, transmit information, exchange information, capture measurements, and so on. The specific I/O) components 1608 that are included in a particular machine will depend on the type of machine. For example, portable machines such as mobile phones may include a touch input device or other such input mechanisms, while a headless server machine will likely not include such a touch input device. It will be appreciated that the I/O components 1608 may include many other components that are not shown in FIG. 16. In various examples, the I/O components 1608 may include user output components 1624 and user input components 1626. The user output components 1624 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1626 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1608 may include biometric components 1628, motion components 1630, environmental components 1632, or position components 1634, among a wide array of other components. For example, the biometric components 1628 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1630 include acceleration sensor components (e.g., accelerometer), gravitation sensor components, rotation sensor components (e.g., gyroscope).

The environmental components 1632 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1634 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1608 further include communication components 1636 operable to couple the machine 1600 to a network 1638 or devices 1640 via respective coupling or connections. For example, the communication components 1636 may include a network interface component or another suitable device to interface with the network 1638. In further examples, the communication components 1636 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1640 may be another machine or any of a wide variety of peripheral devices (e.g., a peripheral device coupled via a USB).

Moreover, the communication components 1636 may detect identifiers or include components operable to detect identifiers. For example, the communication components 1636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1636, such as location via Internet Protocol (IP) geolocation, location via Wi-Fi® signal triangulation, location via detecting an NFC beacon signal that may indicate a particular location, and so forth.

The various memories (e.g., main memory 1616, static memory 1618, and memory of the processors 1604) and storage unit 1620 may store one or more sets of instructions and data structures (e.g., software) embodying or used by any one or more of the methodologies or functions described herein. These instructions (e.g., the instructions 1602), when executed by processors 1604, cause various operations to implement the disclosed examples.

The instructions 1602 may be transmitted or received over the network 1638, using a transmission medium, via a network interface device (e.g., a network interface component included in the communication components 1636) and using any one of several well-known transfer protocols (e.g., hypertext transfer protocol (HTTP)). Similarly, the instructions 1602 may be transmitted or received using a transmission medium via a coupling (e.g., a peer-to-peer coupling) to the devices 1640.

Software Architecture

Figure 17:
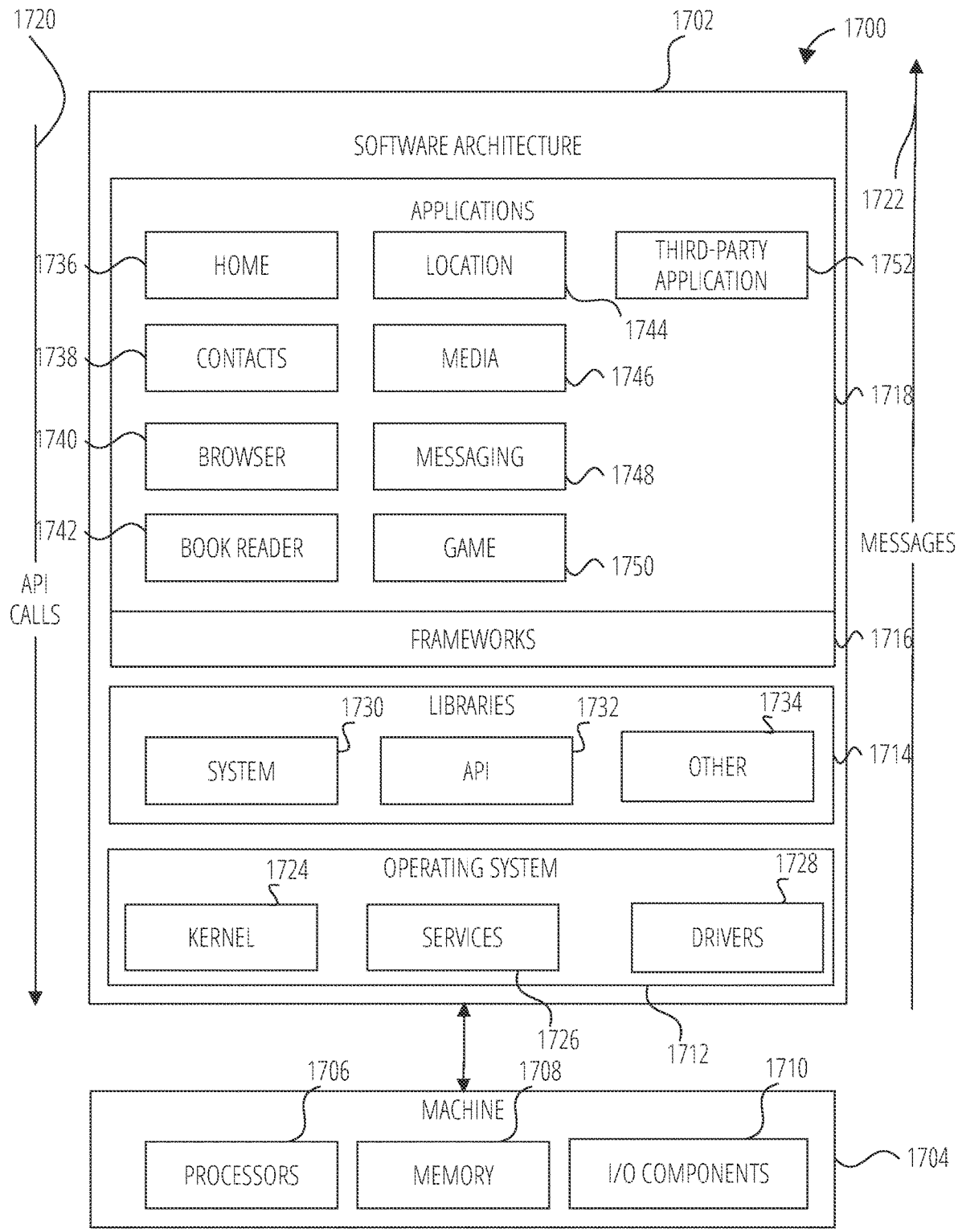
FIG. 17 is a block diagram showing a software architecture within which examples may be implemented.

FIG. 17 is a block diagram 1700 illustrating a software architecture 1702, which can be installed on any one or more of the devices described herein. The software architecture 1702 is supported by hardware such as a machine 1704 that includes processors 1706, memory 1708, and I/O components 1710. In this example, the software architecture 1702 can be conceptualized as a stack of layers, where each layer provides a particular functionality. The software architecture 1702 includes layers such as an operating system 1712, libraries 1714, frameworks 1716, and applications 1718. Operationally, the applications 1718 invoke API calls 1720 through the software stack and receive messages 1722 in response to the API calls 1720.

The operating system 1712 manages hardware resources and provides common services. The operating system 1712 includes, for example, a kernel 1724, services 1726, and drivers 1728. The kernel 1724 acts as an abstraction layer between the hardware and the other software layers. For example, the kernel 1724 provides memory management, processor management (e.g., scheduling), component management, networking, and security settings, among other functionalities. The services 1726 can provide other common services for the other software layers. The drivers 1728 are responsible for controlling or interfacing with the underlying hardware. For instance, the drivers 1728 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1714 provide a common low-level infrastructure used by the applications 1718. The libraries 1714 can include system libraries 1730 (e.g., C standard library) that provide functions such as memory allocation functions, string manipulation functions, mathematic functions, and the like. In addition, the libraries 1714 can include API libraries 1732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1714 can also include a wide variety of other libraries 1734 to provide many other APIs to the applications 1718.

The frameworks 1716 provide a common high-level infrastructure that is used by the applications 1718. For example, the frameworks 1716 provide various graphical user interface (GUI) functions, high-level resource management, and high-level location services. The frameworks 1716 can provide a broad spectrum of other APIs that can be used by the applications 1718, some of which may be specific to a particular operating system or platform.

In an example, the applications 1718 may include a home application 1736, a contacts application 1738, a browser application 1740, a book reader application 1742, a location application 1744, a media application 1746, a messaging application 1748, a game application 1750, and a broad assortment of other applications such as a third-party application 1752. The applications 1718 are programs that execute functions defined in the programs. Various programming languages can be employed to create one or more of the applications 1718, structured in a variety of manners, such as object-oriented programming languages (e.g., Objective-C, Java, or C++) or procedural programming languages (e.g., C or assembly language). In a specific example, the third-party application 1752 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1752 can invoke the API calls 1720 provided by the operating system 1712 to facilitate functionalities described herein.

CONCLUSION

Thus, the interaction system 100 as described herein provides for a shutter button to be draggable in different directions to perform respective functions associated with video recording. In response to a press-and-hold gesture of the shutter button, the interaction client 104 initiates video recording. The interaction client 104 also presents a hands-free icon (e.g., a lock icon) for hands-free video recording, and a flip camera icon for switching between front and rear-facing cameras while recording. The interaction client 104 provides for the shutter button to be draggable in: a first direction (e.g., left, towards the hands-free icon) to initiate hands-free recording; a second direction (e.g., right, towards the flip camera icon) to switch between the front-facing camera and the rear-facing camera; a third direction (e.g., upward) to zoom in on image data captured in real-time; and a fourth direction (e.g., downward) to zoom out with respect to the captured image data.

By virtue of providing a shutter button that is draggable in different directions for different functions, the interaction client 104 provides increased interactive feedback and facilitates video recording. Without providing such a draggable shutter button, performing the respective functions may be difficult and/or cumbersome during video recording. Thus, the interaction client 104 facilitates the capturing of videos, thereby saving time for the user (e.g., by reducing the number of retakes), and reducing computational resources/processing power for the interaction system 100.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems.

What is claimed is:

1. A device comprising:
    a processor, and
    a memory storing instructions that, when executed by the processor, configure the processor to perform operations comprising:
    displaying a user interface within an application running on the device, the user interface presenting real-time image data captured by a camera of the device, the user interface including a shutter button which is configured to be selectable by a user to initiate video recording in response to a first user gesture; and
    upon detecting the first user gesture selecting the shutter button,
    initiating video recording with respect to the real-time image data, and
    providing for the shutter button to be draggable in predefined directions to perform respective functions related to the video recording,
    wherein the predefined directions include a first direction to zoom in on the real-time image data and a second direction to zoom out from the real-time image data.

2. The device of claim 1, wherein the predefined directions include a third direction to initiate hands-free recording.

3. The device of claim 2, wherein the predefined directions include a fourth direction to switch between a front-facing camera and a rear-facing camera of the device.

4. The device of claim 1, the operations further comprising:
    providing, upon detecting the first user gesture selecting the shutter button, plural indications within the user interface that video recording is active.

5. The device of claim 4, wherein the first user gesture comprises a press-and-hold gesture, and
    wherein the plural indications are provided for a duration of the press-and-hold gesture.

6. The device of claim 1, wherein the shutter button is configured to be fixed in place prior to initiating the video recording.

7. A device comprising:
    a processor; and a memory storing instructions that, when executed by the processor, configure the processor to perform operations comprising:
displaying a user interface within an application running on the device, the user interface presenting real-time image data captured by a camera of the device, the user interface including a shutter button which is configured to be selectable by a user to initiate video recording in response to a first user gesture;
upon detecting the first user gesture selecting the shutter button,
initiating video recording with respect to the real-time image data, and
providing for the shutter button to be draggable in predefined directions to perform respective functions related to the video recording:
providing, upon detecting the first user gesture selecting the shutter button, plural indications within the user interface that video recording is active,
wherein the first user gesture comprises a press-and-hold gesture, and
wherein the plural indications are provided for a duration of the press-and-hold gesture;
upon detecting a release of the press-and-hold gesture:
causing the video recording to stop; and
switching from the user interface to a second user interface for previewing and modifying the video recording.

8. The device of claim 1, wherein the shutter button is selectable to take a picture in response to a second user gesture.

9. The device of claim 8, the operations further comprising, upon detecting the second user gesture selecting the shutter button,
taking the picture with respect to the real-time image data, and
providing an indication of taking the picture within the user interface.

10. A method, comprising:
displaying a user interface within an application running on a device, the user interface presenting real-time image data captured by a camera of the device, the user interface including a shutter button which is configured to be selectable by a user to initiate video recording in response to a first user gesture; and
upon detecting the first user gesture selecting the shutter button,
initiating video recording with respect to the real-time image data, and
providing for the shutter button to be draggable in predefined directions to perform respective functions related to the video recording,
wherein the predefined directions include a first direction to zoom in on the real-time image data and a second direction to zoom out from the real-time image data.

11. The method of claim 10, wherein the predefined directions include a third direction to initiate hands-free recording.

12. The method of claim 11, wherein the predefined directions include a fourth direction to switch between a front-facing camera and a rear-facing camera of the device.

13. The method of claim 10, further comprising:
providing, upon detecting the first user gesture selecting the shutter button, plural indications within the user interface that video recording is active.

14. The method of claim 13, wherein the first user gesture comprises a press-and-hold gesture, and
wherein the plural indications are provided for a duration of the press-and-hold gesture.

15. The method of claim 10, the shutter button is configured to be fixed in place prior to initiating the video recording.

16. The method of claim 10, wherein the shutter button is selectable to take a picture in response to a second user gesture.

17. A method, comprising:
displaying a user interface within an application running on a device, the user interface presenting real-time image data captured by a camera of the device, the user interface including a shutter button which is configured to be selectable by a user to initiate video recording in response to a first user gesture;
upon detecting the first user gesture selecting the shutter button,
initiating video recording with respect to the real-time image data, and
providing for the shutter button to be draggable in predefined directions to perform respective functions related to the video recording;
providing, upon detecting the first user gesture selecting the shutter button, plural indications within the user interface that video recording is active,
wherein the first user gesture comprises a press-and-hold gesture, and
wherein the plural indications are provided for a duration of the press-and-hold gesture;
upon detecting a release of the press-and-hold gesture:
causing the video recording to stop; and
switching from the user interface to a second user interface for previewing and modifying the video recording.

18. A non-transitory computer-readable storage medium, the computer-readable storage medium including instructions that when executed by a computer, cause the computer to perform operations comprising:
displaying a user interface within an application running on a device, the user interface presenting real-time image data captured by a camera of the device, the user interface including a shutter button which is configured to be selectable by a user to initiate video recording in response to a first user gesture; and
upon detecting the first user gesture selecting the shutter button,
initiating video recording with respect to the real-time image data, and
providing for the shutter button to be draggable in predefined directions to perform respective functions related to the video recording,
wherein the predefined directions include a first direction to zoom in on the real-time image data and a second direction to zoom out from the real-time image data.

* * * * *

UNITED STATES PATENT AND TRADEMARK OFFICE
CERTIFICATE OF CORRECTION

| | | |
|---|---|---|
| PATENT NO. | : 12,348,855 B2 | Page 1 of 1 |
| APPLICATION NO. | : 18/326789 | |
| DATED | : July 1, 2025 | |
| INVENTOR(S) | : Desserrey et al. | |

It is certified that error appears in the above-identified patent and that said Letters Patent is hereby corrected as shown below:

In the Claims

In Column 34, Line 28, In Claim 1, delete "processor," and insert --processor;-- therefor In Column 35, Line 16, In Claim 7, delete "recording:" and insert --recording;-- therefor Signed and Sealed this
Ninth Day of December, 2025

John A. Squires
*Director of the United States Patent and Trademark Office*